United States Patent
Stowe

(10) Patent No.: US 6,827,508 B2
(45) Date of Patent: Dec. 7, 2004

(54) OPTICAL FIBER FUSION SYSTEM

(75) Inventor: David W. Stowe, Milford, MA (US)

(73) Assignee: Fiber Optic Network Solutions Corporation, Northborough, MA (US)

( * ) Notice: Subject to any disclaimer, the term of this patent is extended or adjusted under 35 U.S.C. 154(b) by 0 days.

(21) Appl. No.: 09/861,398

(22) Filed: May 24, 2001

(65) Prior Publication Data

US 2002/0176672 A1 Nov. 28, 2002

(51) Int. Cl.$^7$ ............................................. G02B 6/255
(52) U.S. Cl. ............................ 385/96; 385/98; 65/406; 65/501
(58) Field of Search ....................... 385/96–99; 65/406, 65/501

(56) References Cited

U.S. PATENT DOCUMENTS

| | | | | |
|---|---|---|---|---|
| 4,149,929 A | * | 4/1979 | Ladany ........................ | 216/83 |
| 4,482,203 A | | 11/1984 | Stowe et al. ............. | 350/96.15 |
| 4,632,513 A | | 12/1986 | Stowe et al. ............... | 350/320 |
| 4,798,436 A | | 1/1989 | Mortimore ............... | 350/96.15 |
| 4,844,573 A | | 7/1989 | Gillham et al. .......... | 350/96.15 |
| 4,971,418 A | * | 11/1990 | Dorsey et al. .............. | 385/96 |
| 4,979,972 A | * | 12/1990 | Berkey et al. .............. | 65/408 |
| 4,997,247 A | * | 3/1991 | Stowe ........................ | 385/50 |
| 4,997,248 A | | 3/1991 | Stowe ..................... | 350/96.15 |
| 5,067,787 A | | 11/1991 | Gillham et al. ............. | 385/50 |
| 5,166,994 A | | 11/1992 | Stowe et al. ............... | 385/48 |
| 5,195,151 A | | 3/1993 | Campbell, Jr. et al. ...... | 385/43 |
| 5,224,977 A | * | 7/1993 | Anjan et al. ................ | 65/411 |
| 5,293,440 A | | 3/1994 | Miles et al. ................ | 385/51 |
| 5,408,554 A | | 4/1995 | Cryan et al. ................ | 385/43 |
| 5,459,804 A | | 10/1995 | Stowe ........................ | 385/42 |
| 5,553,179 A | | 9/1996 | Cryan et al. ................ | 385/43 |
| 5,710,848 A | * | 1/1998 | Dumais et al. .............. | 385/43 |
| 5,931,983 A | | 8/1999 | Bloom ....................... | 65/378 |
| 5,948,134 A | | 9/1999 | Bloom ....................... | 65/376 |
| 6,018,965 A | | 2/2000 | Bloom ....................... | 65/378 |
| 6,086,775 A | * | 7/2000 | Pritchett, Jr. et al. ........ | 216/24 |
| 6,112,555 A | | 9/2000 | Bloom ....................... | 65/378 |
| 6,341,503 B1 | * | 1/2002 | Miller et al. ................ | 65/387 |
| 2002/0012504 A1 | | 1/2002 | Gillham et al. ............. | 385/86 |

FOREIGN PATENT DOCUMENTS

| | | |
|---|---|---|
| EP | 1 065 539 A2 | 6/2000 |
| EP | 1 076 251 A1 | 8/2000 |
| WO | WO 90/08968 | 1/1990 |
| WO | WO 95/16931 | 12/1994 |

* cited by examiner

Primary Examiner—Akm Enayet Ullah
Assistant Examiner—Michelle R. Connelly-Cushwa
(74) Attorney, Agent, or Firm—Bowditch & Dewey, LLP

(57) ABSTRACT

An automated fusion system includes a draw assembly for holding optical fibers and for applying a tension to the fibers. The fibers are held substantially parallel to each other in the draw assembly. The system also includes a removal station that etches or strips buffer material from the fibers after the fibers have been placed in the draw assembly, and a heater or torch assembly for heating the fibers as the draw assembly applies a tension to the fibers in a manner that causes the fibers to fuse together to form a coupler region. In addition, a packaging station is used to secure a substrate to the coupler region of the fibers to form the optical coupler.

36 Claims, 29 Drawing Sheets

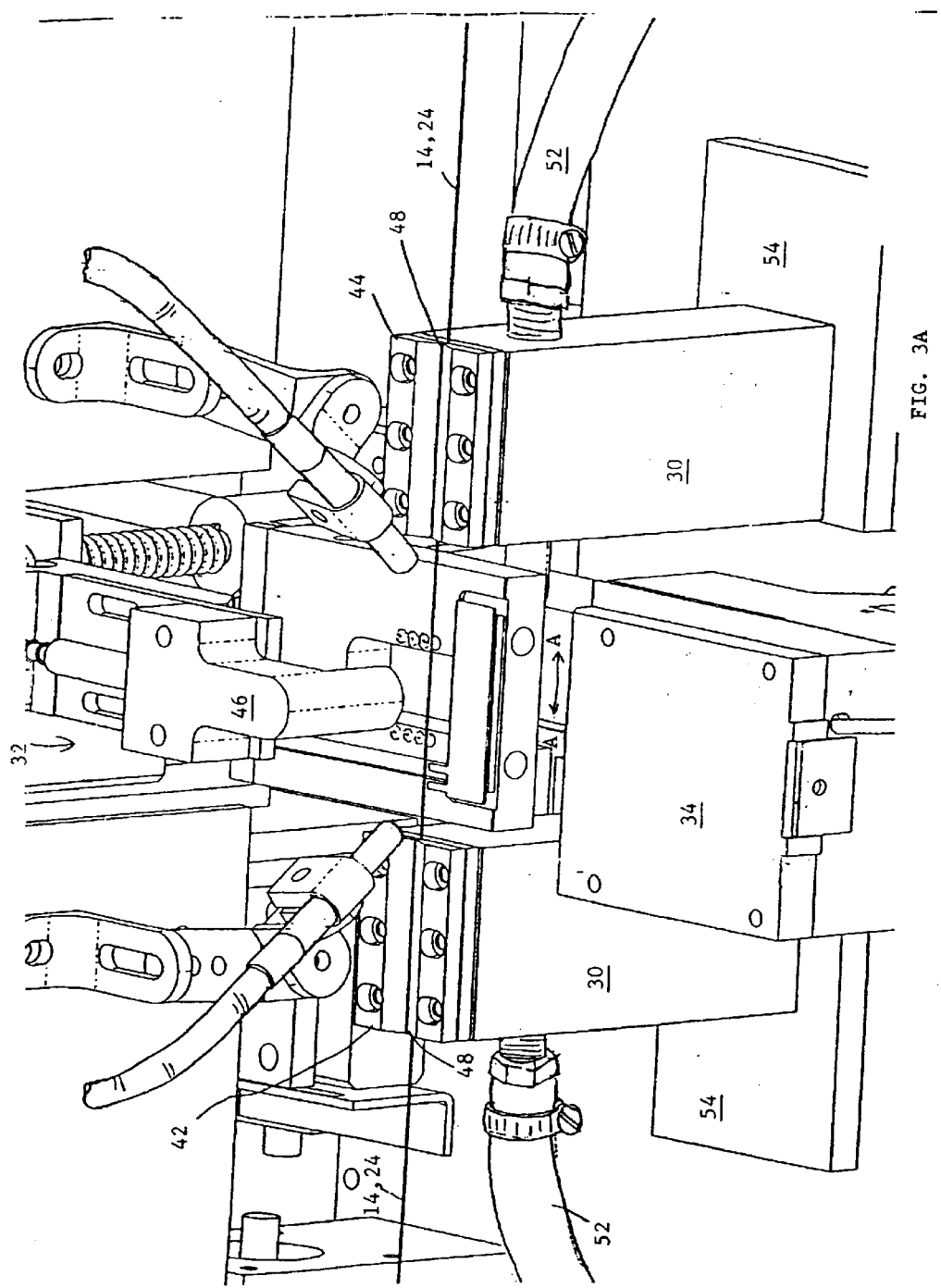

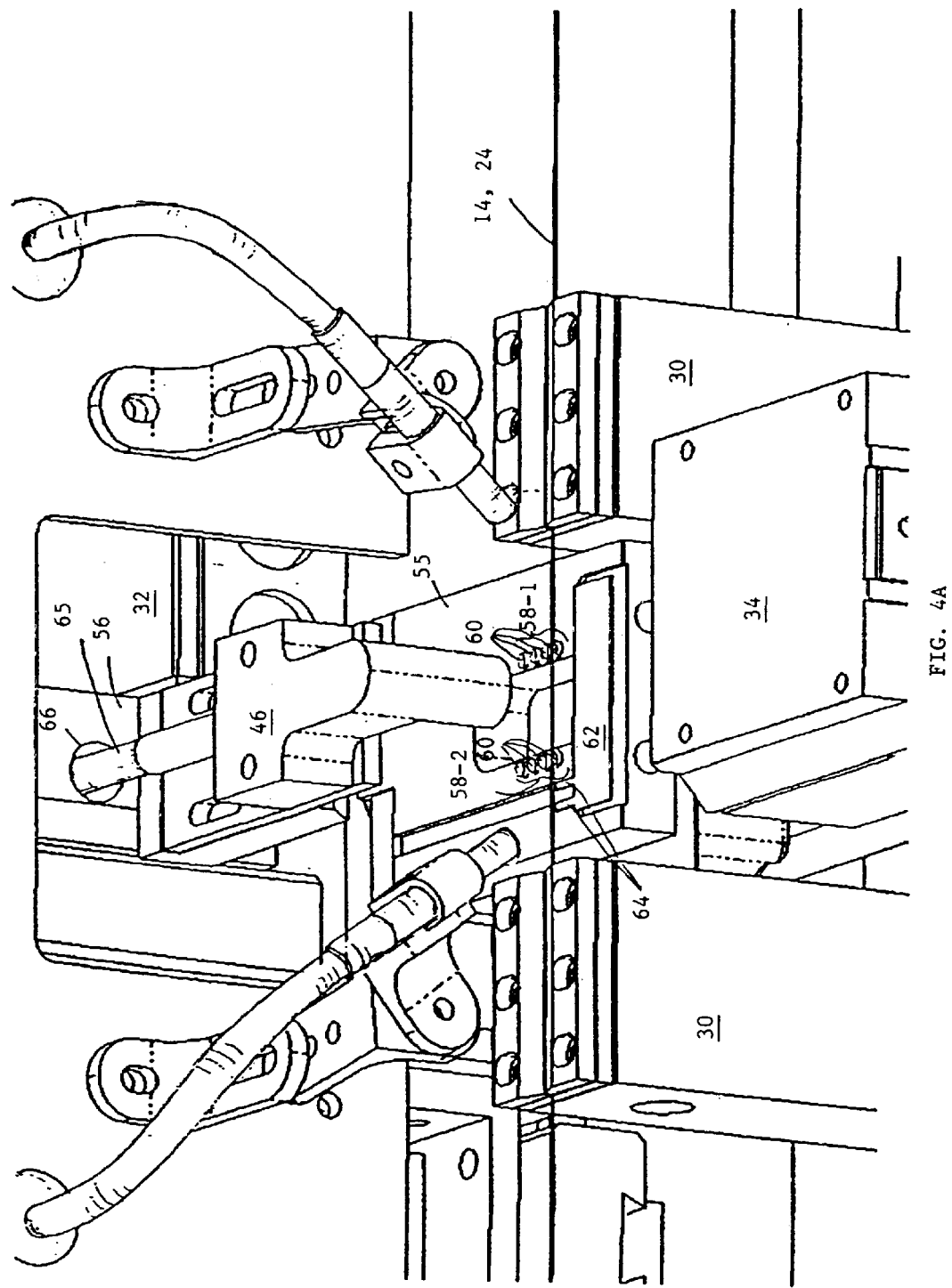

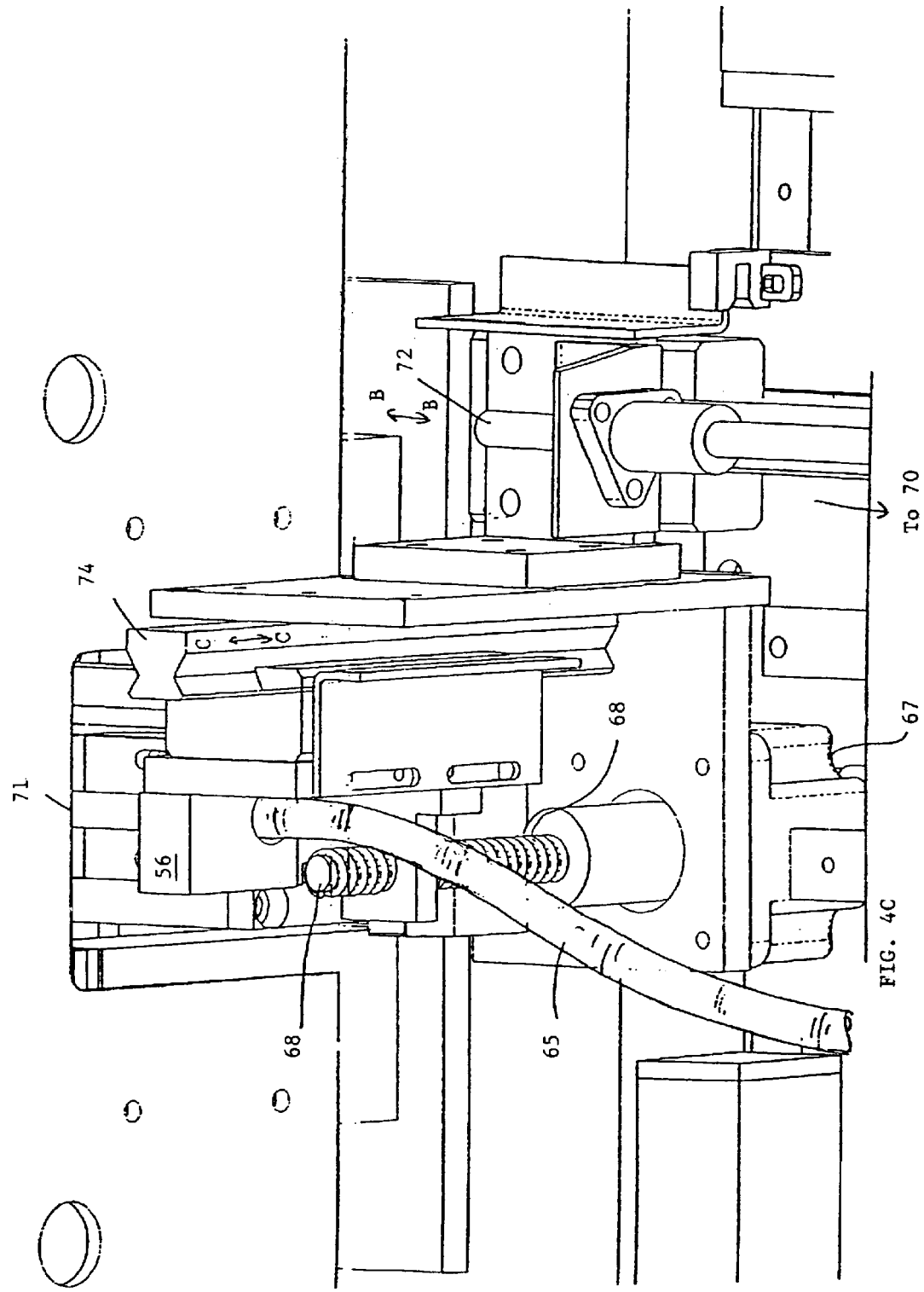

OPTICAL FIBER FUSION SYSTEM

BACKGROUND OF THE INVENTION

Certain communications systems use optical couplers to route light signals throughout a network. The couplers combine signals from two or more optical fibers or split signals from, for example, a single fiber to two or more fibers. These couplers are typically formed by first stripping and cleaning two or more optical fibers in the regions of the fibers that are to be fused together, twisting these fibers about each other, and then heating the twisted region with a heat source while simultaneously pulling the fibers so that the fibers in that region fuse together. Finally, the fused region is epoxied into a substrate, such as, for example, fused silica, ceramic, or Invar to provide support. The entire fabrication process of the coupler has been performed manually.

SUMMARY OF THE INVENTION

Such optical couplers have been accepted in the industry, and they are considered to perform reasonably well for their intended purpose. However, they are not without their shortcomings. In particular, there are certain drawbacks of using a manual fabrication approach to produce couplers. For instance, there is a large variation in the quality of the final products associated with the wide tolerances which typify manual fabrication processes. Because there are many different grades of couplers produced with manual processes, the yield of high quality couplers tends to be low. It is desirable therefore to produce optical couplers with tighter tolerances and a higher yield.

The present invention greatly reduces problems encountered in the aforementioned manual fabrication processes. The present invention provides an automated system to produce optical couplers with minimal operator intervention.

In one aspect of the invention, an automated fusion system includes a draw assembly for holding optical fibers and for applying a tension to the fibers. The fibers are held substantially parallel to each other in the draw assembly. The system also includes a removal station that etches or strips buffer material from the fibers after the fibers have been placed in the draw assembly, and a heater or torch assembly for heating the fibers as the draw assembly applies a tension to the fibers in a manner that causes the fibers to couple or fuse together to form a coupler region. In addition, a packaging station is used to secure a substrate to the coupler region of the fibers to form the optical coupler.

Typically, the system includes a controller to control the functions of the draw assembly, removal station, torch assembly, and packaging station. The controller can also facilitate monitoring the functions of the draw assembly, removal station, torch assembly, and packaging station.

Embodiments of this aspect can include one or more of the following features. In some embodiments, the system includes an optical detector for monitoring the extent of the coupling while the optical coupler is being formed, and the removal station includes a removal heater assembly for heating acid used to strip the buffer material. The removal station can be provided with a thermocouple to measure the temperature of the acid, and the removal heater assembly can include a heater coil spirally wound around a mandril which contains an electrical heating cartridge.

In other embodiments the removal station is provided with an acid inlet and an acid drain hole, and a rinse water inlet hole and a water drainage hole. Typically, the removal station includes an acid etching section which facilitates formation of a meniscus of acid in which the fibers reside while being stripped of buffer material, as well as a rinse section which facilitates formation of a meniscus of rinse material in which the fibers reside while being rinsed of acid. In many embodiments, the removal station uses sulfuric acid to strip the buffer material, and de-ionized water to rinse the acid from the fibers. The sulfuric acid is usually heated to a temperature of about between 160° C. to 200° C.

In certain embodiments, the draw assembly includes a pair of vacuum chucks, which can be provided with a V-groove in which the fibers are positioned such that the vacuum chucks are coupled to a vacuum source which creates a suction along the V-grooves. Typically, the vacuum chucks are drawn apart at a rate of about between 50 microns/sec to 500 microns/sec.

In some embodiments, the torch assembly includes a ceramic torch which uses hydrogen fuel to produce a flame at the bottom of the ceramic torch. The torch assembly can include a fork plate provided with connector ferrules through which a vacuum is drawn that causes the fibers to be in contact. Generally, the fork plate and the ceramic torch are independently movable relative to each other. The fork plate can include a strip heater for evaporating residual water and acid from the fibers.

The packaging station can include a base provided with at least one slot into which the substrate is placed. The base is typically connected to a vacuum source which draws a vacuum through a hole in the slot to create a suction to hold the substrate in place. Epoxy can be placed at opposite ends of the substrate, and the system can include a UV curing light which emits radiation to cure epoxy after the fibers have been placed in the substrate.

In some embodiments, the system includes a fluid delivery system for delivery of acid and water to and from the removal station, and the delivery system includes a valve control box. The valve control box can include one or more solenoid valves to control the flow of acid, rinse water, and waste products.

The fluid delivery system can specifically include an acid delivery system, a water delivery system, and a vacuum fluid removal system. In some embodiments, the water delivery system includes a reservoir arranged such that the water is fed to the removal station by gravity, and the acid delivery system includes a supply line for transmitting acid to the removal station. Typically, the supply line has one end placed in an acid supply container, and an opposite end provided with a constrictor to maintain the supply rate of acid to the removal station. The acid delivery system can include a pump which in combination with the constrictor maintains the supply rate of acid to the removal station. The acid delivery system can also include a manometer to visually monitor the supply pressure of the acid to the removal station, and to provide a relief path in the event that the constrictor clogs up with debris. The acid delivery system can include a regulator which prevents backflow of acid from the manometer to the removal station in the event that the supply pressure is inadequate.

Related aspects of the invention include a method for forming an optical coupler. In this method, optical fibers are positioned on a draw assembly and a substrate is loaded in a packaging station. A portion of the fibers is placed in an acid bath of an removal station to strip buffer material from the fibers, and the fibers are rinsed after the acid bath to remove residual acid. Heat is applied to the rinsed region of the fibers to remove remnant liquid acid and water. A vacuum is drawn through a set of connector ferrules to hold the fibers together, and a tensile force is applied to the fibers with the draw assembly. While applying a tensile force to the fibers, a flame from a torch is applied to the fibers in a manner so that the combination of the tensile force and the heat from the flame causes the fibers to fuse together to form a coupler. Finally, a substrate is attached to the fibers to protect the fused region of the fibers to form the optical coupler.

Embodiments of this aspect can include securing the fibers to a set of chucks with a vacuum, filling a basin with acid to form a meniscus of acid in which the fibers reside, and subsequently draining the acid, and filling another basin with water to form a meniscus of water in which the fibers reside during the rinsing process, and subsequently draining the water. The fibers can be rinsed a second time.

In some embodiments, while the tensile force and heat are applied to the fibers, a laser light is activated to supply light at one end of one of the fibers to facilitate monitoring the coupling of the fibers. A coupling ratio or fixed length draw can be chosen, and the data related to the coupling process can be recorded. Also, the method can include placing the fibers in epoxy provided at each end of the substrate, and activating a UV light source to cure the epoxy once the fibers are placed in the substrate.

Among other advantages, the fusion process is entirely automated. The operator merely initializes the positions of the fixtures and stages, places unstripped fibers onto the drawing chucks and loads substrates with preloaded adhesive on the packaging station, and then activates the computer control program to initiate the fabrication process. The remaining steps are performed automatically under computer control. After the fusion process is complete, the operator removes the completed coupler from the station and places a new set of fibers on the drawing chucks for the next draw.

This automated process minimizes insertion losses because the fusion process is performed with tighter tolerances than manual processes. Because the stripping and the cleaning of the optical fibers is performed in the draw station immediately prior to the fusion process, there is an increased likelihood of preserving the cleanliness of the fibers during the draw. Further, the stripped fibers can be aligned and positioned at the same place relative to the alignment mechanism, thereby facilitating a more consistent fabrication process.

The use of connector ferrules for holding the fibers in place provides for a low cost precision vacuum assembly, because the ferrules can be readily made repeatedly with very tight manufacturing tolerances. Vertical motion of the torch assembly facilitates moving the torch only a small distance to remove the flame from the fibers which provides added versatility in the process control. Moreover, because the epoxy is applied to the supporting substrate prior to the mounting of the fiber in the fusion assembly, there is no time-consuming application of the adhesive while the coupler is located in the fusion system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and 3B are close-up views of a removal station, a draw assembly, and a torch assembly of the fusion system of FIG. 1B.

FIG. 4A is a close-up view of the torch assembly of FIGS. 3A and 3B.

FIG. 4C is a back-side view of the torch assembly of FIGS. 3A and 3B.

DETAILED DESCRIPTION OF THE INVENTION

Figure 1A:
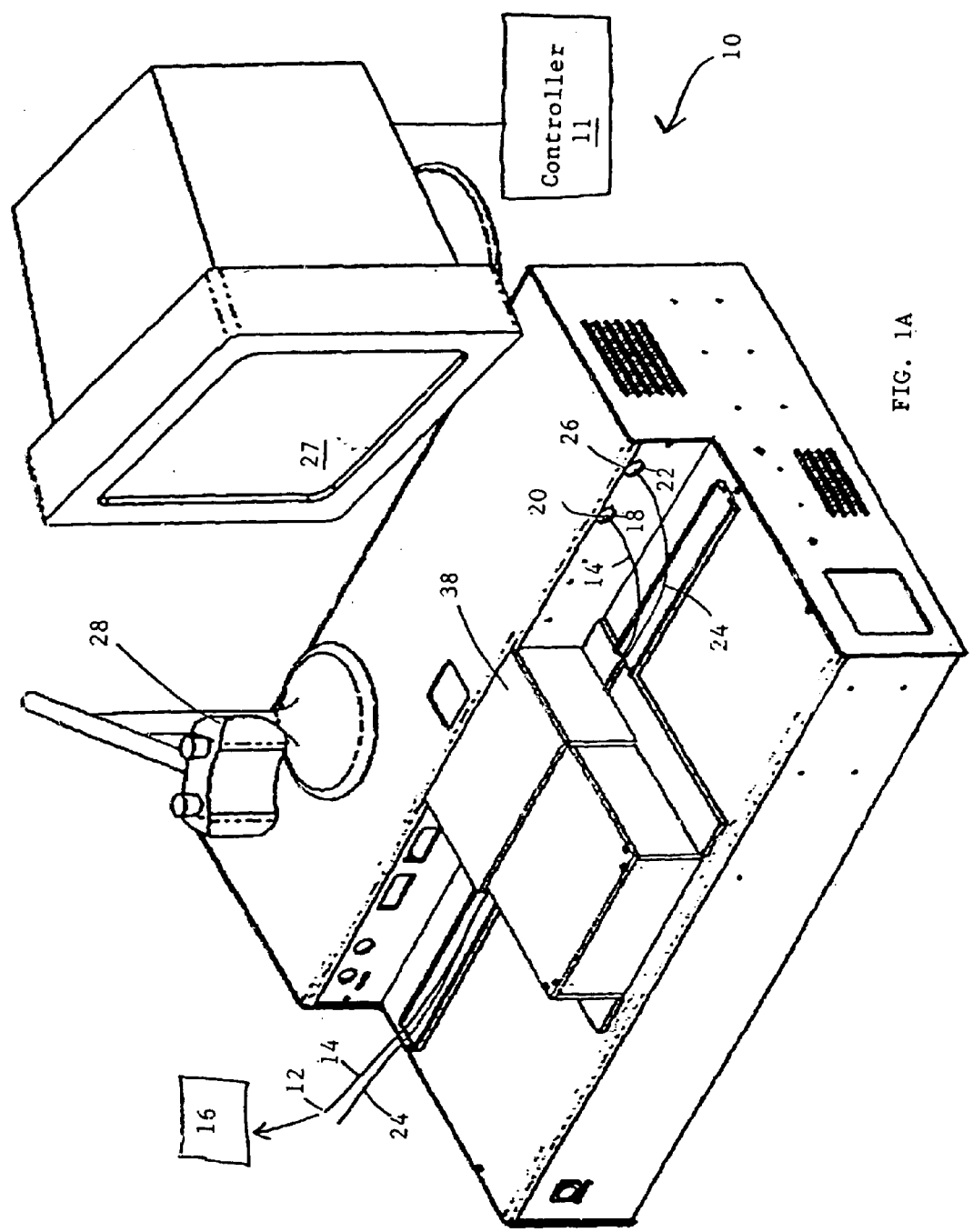
FIG. 1A is a perspective view of an automated fiber fusion system in accordance with the invention.

A description of preferred embodiments of the invention follows. The automated fiber fusion system of the present invention is illustrated generally at 10 in FIG. 1A. The fusion system 10 is an automated system operated by a controller 11 to fabricate optical splitters and couplers with minimal human intervention. Other than placing the fibers and loading the substrates, which attach to the fibers to protect the couplers, in the system 10, monitoring the fabrication process, and removing the completed coupler from the system, no human intervention is required to complete the fabrication of the couplers. After placing the fibers and loading the substrates in the fusion system 10, the operator initiates the system which strips the buffer material from the fibers, cleanses the fibers, draws the fibers apart while fusing the fibers with a torch, places the fibers in a substrate, and finally cures the epoxy placed in the substrate to secure the substrate to the fibers. Note that both optical couplers and splitters are contemplated in the present invention, and are interchangeable. Hence, hereinafter, only the term "coupler" will be used.

To monitor the coupler fabrication process, one end 12 of a fiber 14 is connected to a laser source 16 and the other end 18 is connected to an optical detector 20. One end 22 of a second fiber 24 is also connected to another optical detector 26. During the coupling process, the optical detectors receive optical output signals from the two fibers 14, 24 which are displayed on a video monitor 27 to provide data to the operator indicating that the fibers have been successfully coupled. The entire monitoring process is typically operated by the controller 11. The fusion system 10 is also provided with a microscope 28 to allow the operator to visually monitor the fabrication process.

Figure 1B:
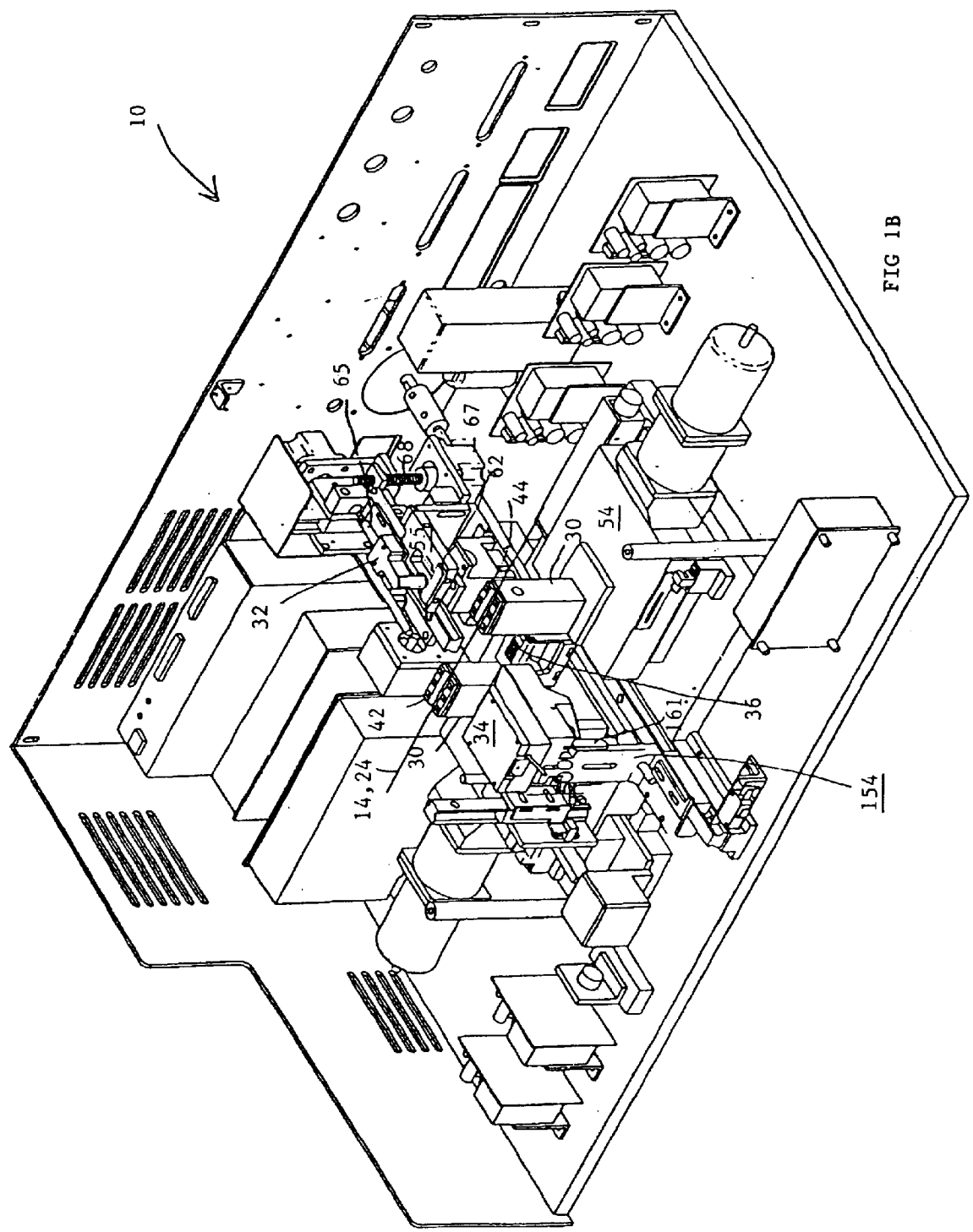
FIG. 1B is a cut-away view of the automated fiber fusion system of FIG. 1A.

In addition to the laser source 16, the fusion system 10 includes a draw assembly 30, a heater or torch assembly 32, an removal station 34, and a packaging station 36, as shown in FIG. 1B. A plastic covering 38 (FIG. 1A) is placed over the draw assembly 30, the torch assembly 32, the removal station 34, and the packaging station 36 to prevent air currents from adversely affecting the torch flame.

Figure 2:
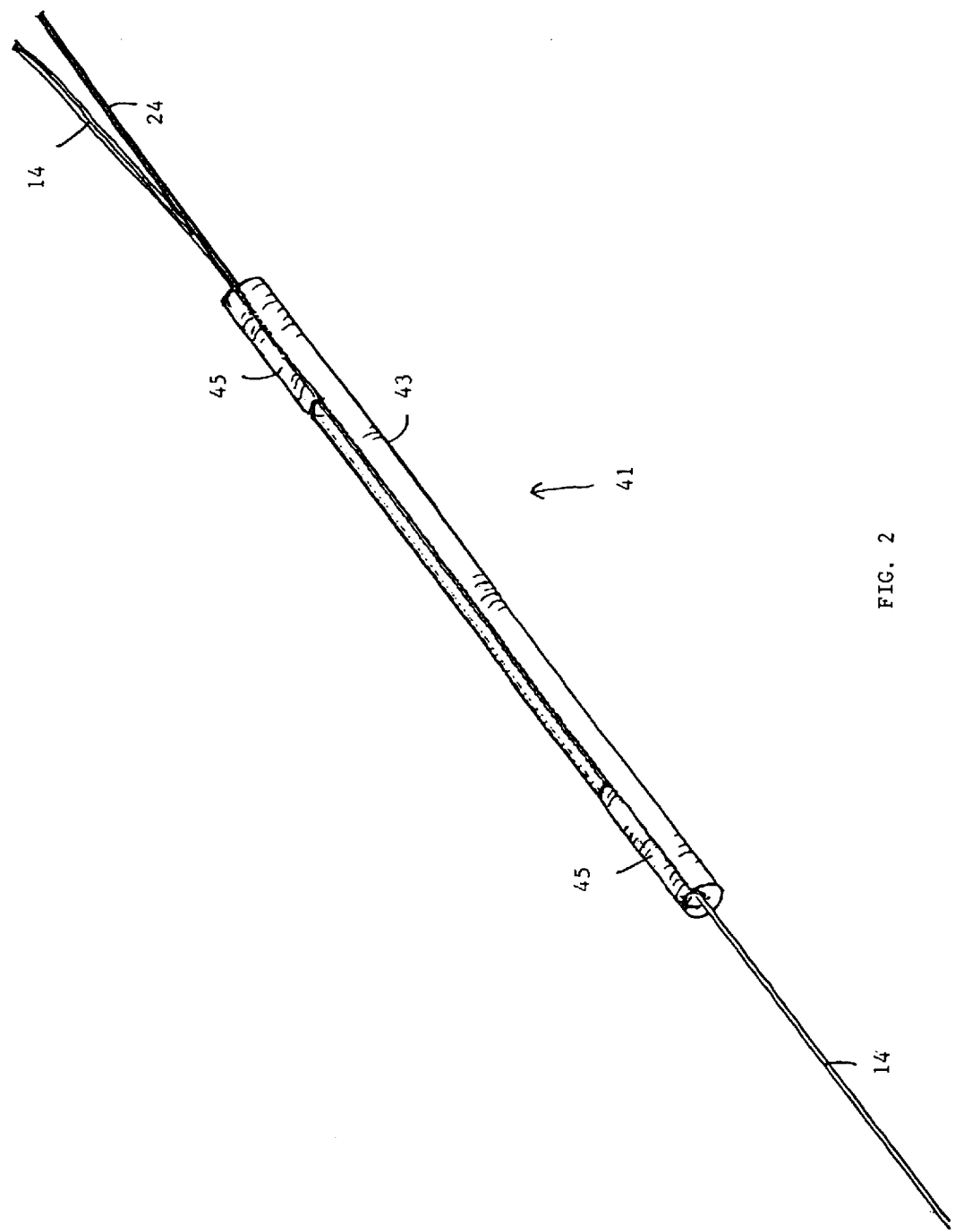
FIG. 2 is a close-up view of an optical coupler fabricated with the fusion system of FIG. 1.

Referring to FIG. 2, there is shown a coupler assembly 41 fabricated with the fusion system 10. The coupler 41 is made from the pair of fibers 14 and 24 fused together and positioned along a thin channel of a fused silica substrate 43, and secured to the substrate 43 with epoxy 45 located on either end of the substrate 43.

Figure 3B:
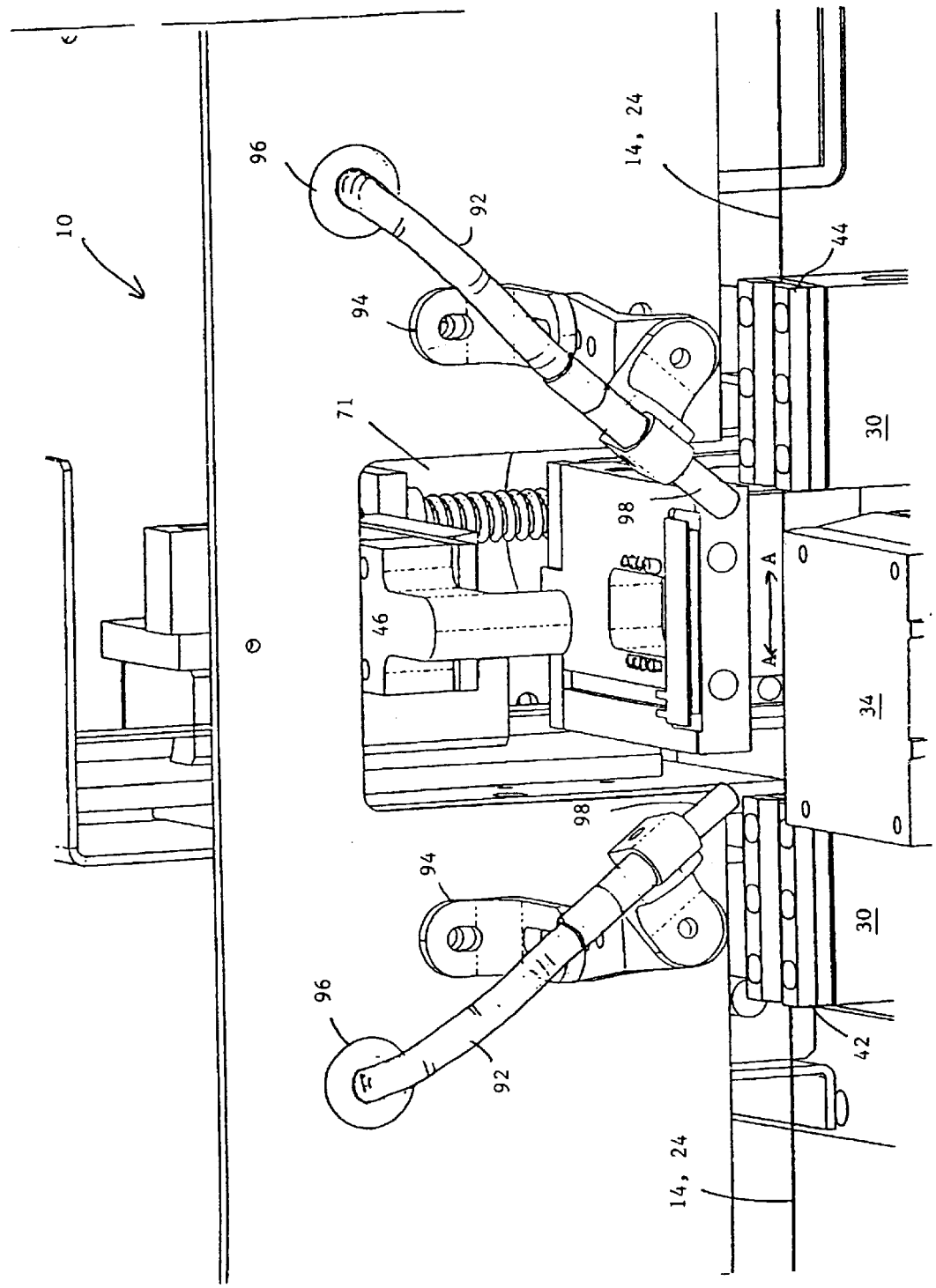

Referring now to FIGS. 3A and 3B, the draw assembly 30 includes a pair of vacuum chucks 42 and 44 positioned on either side of a ceramic torch 46 of the torch assembly 32. Each of the chucks 42 and 44 is provided with a V-groove 48 along which the fibers 14 and 24 are placed to keep them from moving around during the fabrication process. Each chuck 42 and 44 is connected to a vacuum source through a respective hose 52 that draws a vacuum along the groove 48 to hold the fibers in place.

Each of the chucks 42 and 44 is mounted on a respective base plate 54 which slides back and forth in the direction of the double arrow A—A relative to a non-moving table that supports the base plates 54 of the fusion system 10. The base plates 54 are each connected to a stepper motor through a screw gear. Thus, when the stepper motor is activated, the chucks 42 and 44 either move synchronously in or away from the ceramic torch 46. During a typical draw process, each chuck 42, 44 moves outward at a speed of about 50 microns/sec to 500 microns/sec.

Figure 4B:
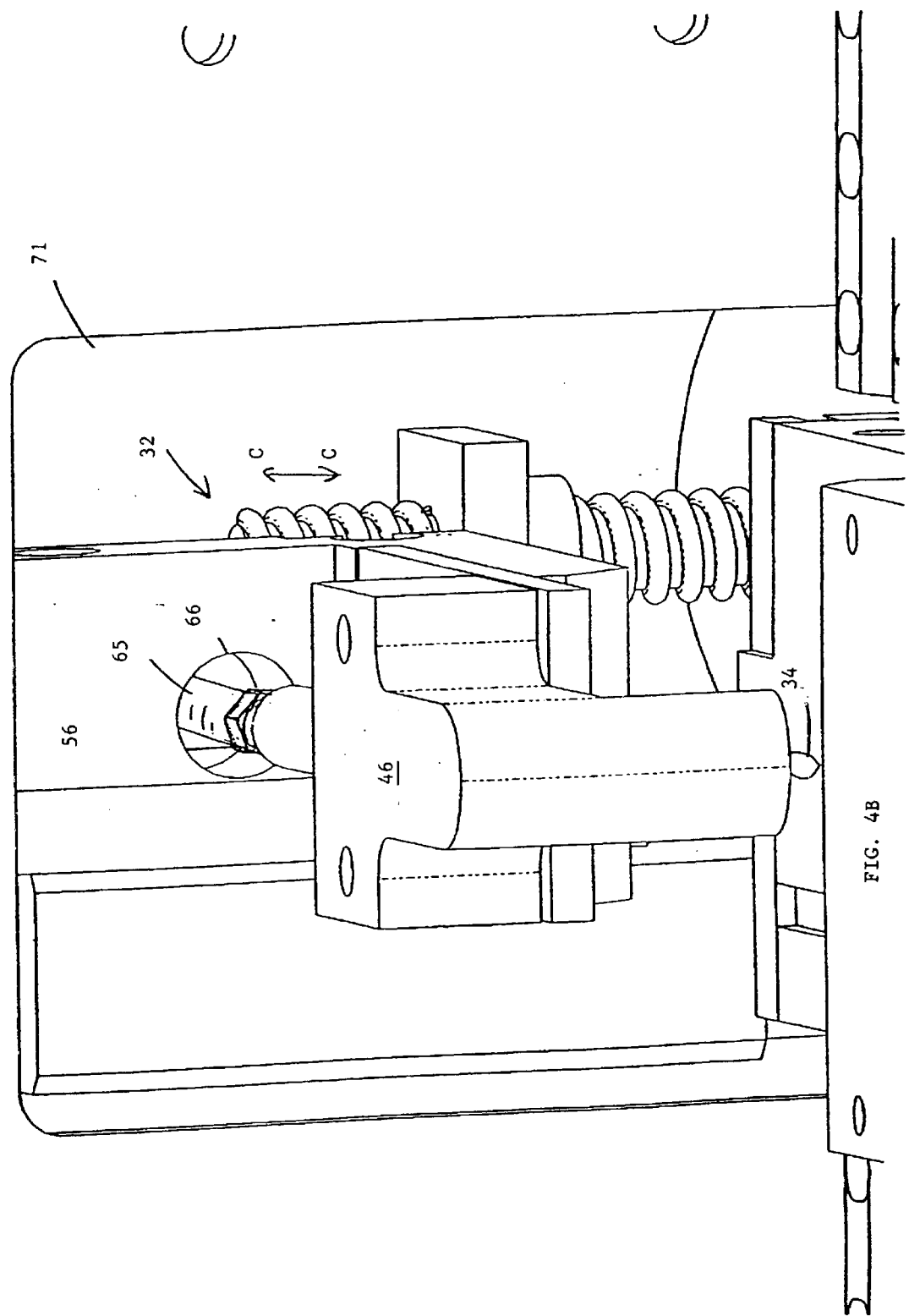
FIG. 4B is an even closer view of the torch assembly of FIGS. 3A and 3B.

The torch assembly 32 is illustrated in greater detail in FIGS. 4A–4C. The torch assembly 32 includes a fork plate 55 and the ceramic torch 46 which is mounted to a torch plate 56. Alternatively, other heat sources, such as, for example, a laser, can be used in place of the ceramic torch 46. The fork plate 55 includes multiple sets of ferrules 58-1 and 58-2 located on either side of the ceramic torch 46. Each ferrule 58 is provided with a 0.012 inch hole 60 at the top of the ferrule. The ferrules 58 are connected to vacuum source which draws a vacuum through the holes of the ferrules. The vacuum holds the fibers 14, 24 against the ferrules and causes the fibers to contact each other laterally during the fusion process. The use of the ferrules 58 facilitates fusing the fibers without twisting the fibers together before the fusion process.

The fork plate 55 is also provided with a flat heating element 62 located at the front of the plate 55. The heating element 62 is essentially a pad which is connected to an electric power source with a set of leads 64. The heating element 62 is used to heat the optical fibers after the etching and rinsing process (described below) to remove or evaporate residual water and also to react any residual sulfuric acid that might be remaining on the fibers.

The ceramic torch 46 is made of machinable ceramic alumina and is connected to a hydrogen source with a flexible tube 65 which is fed through a hole 66 of the torch plate 56. The inner diameter of the torch is about 8 mm. During the fusion process, the ceramic torch burns a hydrogen flame 34 generated at the bottom of the torch. Typically, the hydrogen flows at about 50 to 300 cubic cm per minute during the fusion process.

Referring to FIG. 4C, a stepper motor 67 connected to a drive shaft 68 provides the vertical movement of the ceramic torch 46 relative to the fork plate 55 up and down along a rail 74. Another stepper motor 70 and a corresponding drive 72 shaft provide the horizontal movement of the ceramic torch 46 and the fork plate 55 such that the torch 46 and the fork plate 55 move out of an opening 71 with the fork plate 55 positioned beneath the fibers and the torch 46 positioned above the fibers. Both the torch assembly and the fork plate are able to move in and out along a horizontal axis indicated by the double arrow B—B at about 0.5 inch per second.

In sum, the ceramic torch 46 and the fork plate 55 move in and out together in the direction of the double arrow B—B (FIG. 4C). The ceramic torch 46, however, has an additional degree of motion which allows it to move up and down in the direction of the double arrow C—C (FIGS. 4B and 4C).

Figure 5A:
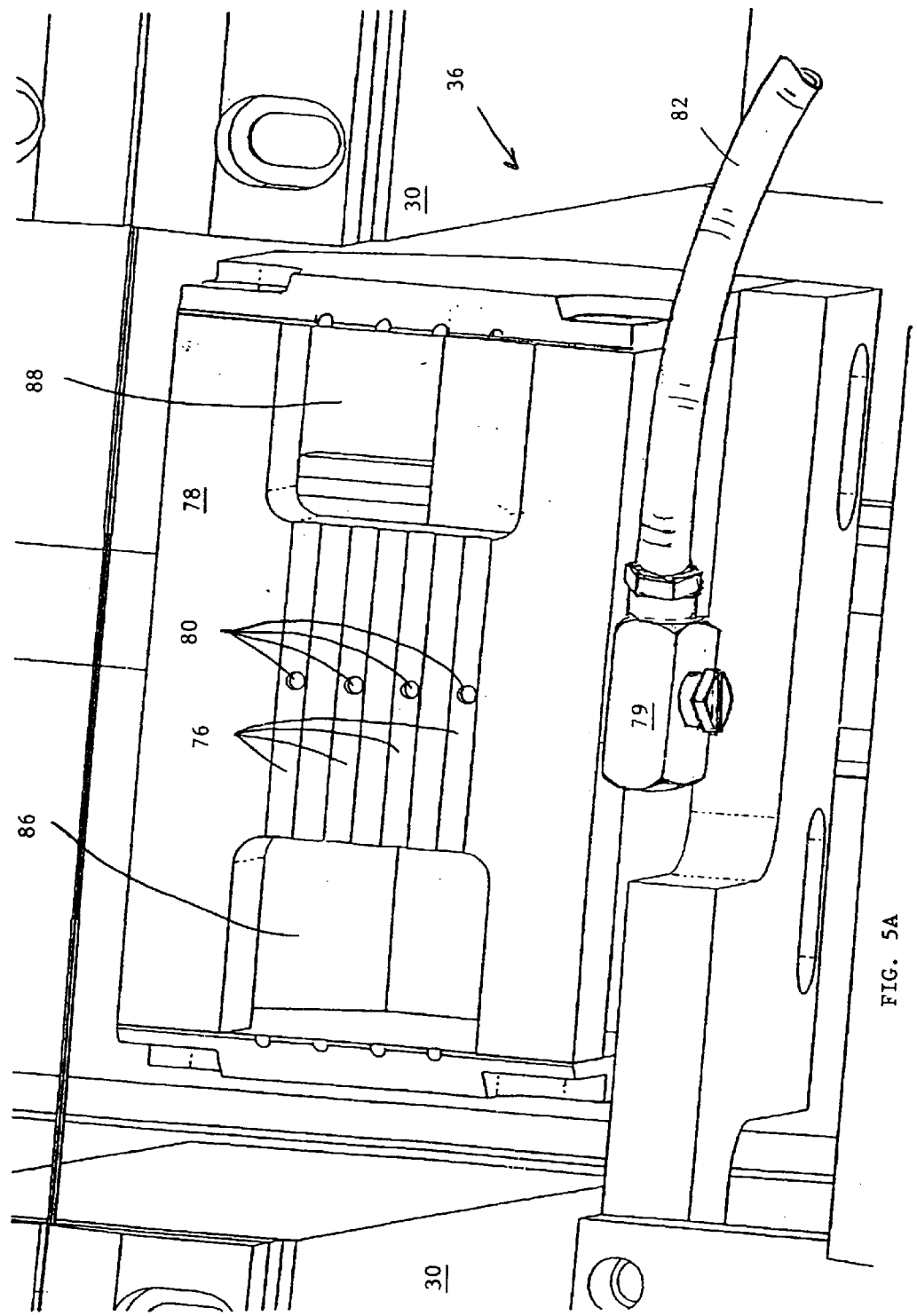
FIG. 5A is a close-up view of the packaging station of FIG. 1B.

The packaging station 36 is illustrated in particular detail in FIG. 5A. The packaging station 36 is provided with four slots 76 in a base 78 which allows the packaging station to accommodate up to four substrates 43 (FIG. 2), although only one coupler is fabricated at a time. The base 78 is attached to a fixture 79 which is connected to a hose 82. As can be see in FIG. 5A, the center of each slot 76 has a small hole 80. The hose 82 is connected to a vacuum source which draws a vacuum through the hose 82 and consequently through the small hole 80, thereby holding the substrate 43 along the slot 76. Also shown in FIG. 5A are a pair of cutouts 86 and 88 arranged to enable the substrate 43 to be placed onto the base 78 without making any contact with epoxy which might have spilled out of a substrate during a previous fabrication process.

Figure 5B:
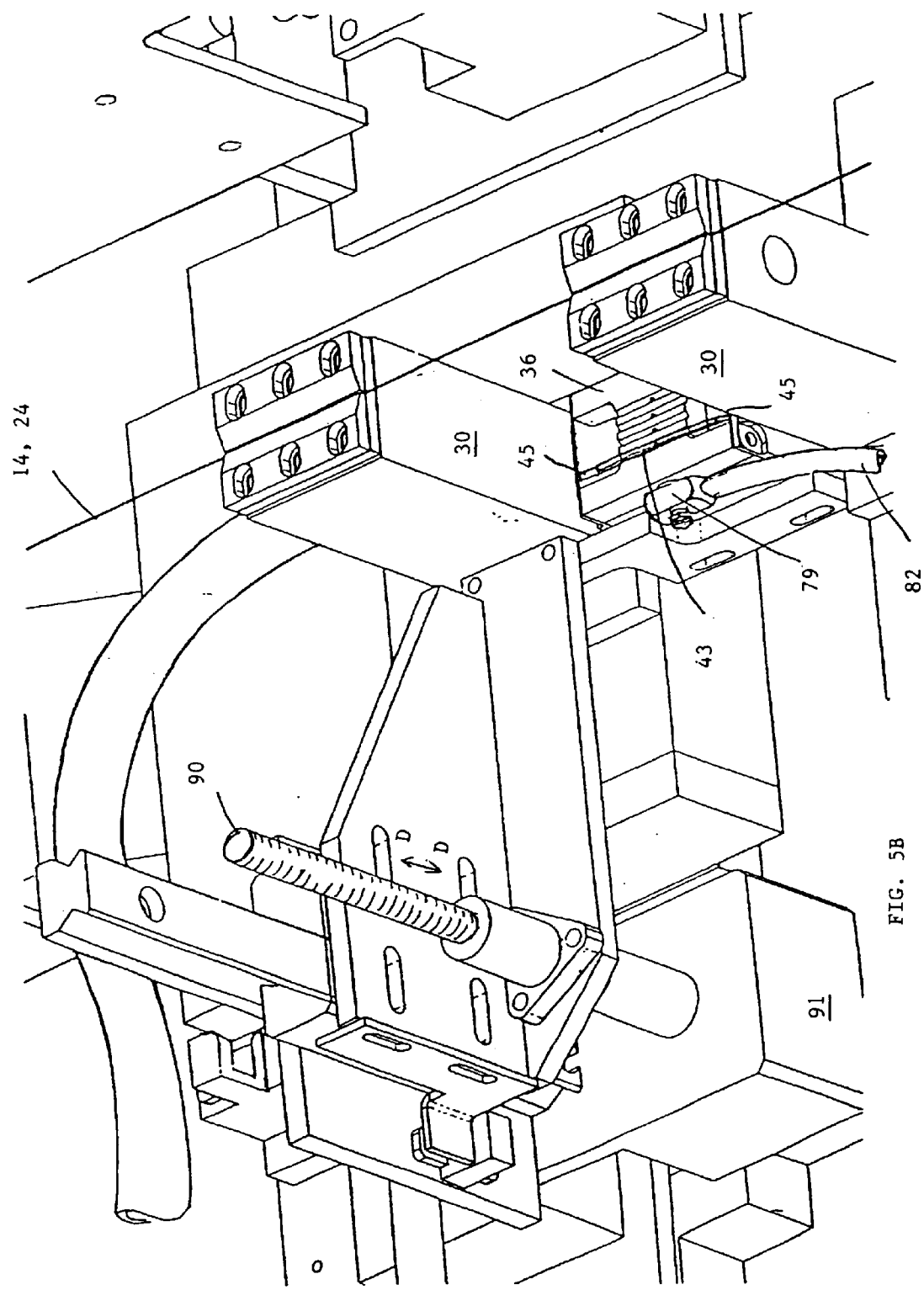
FIG. 5B is a close-up view of a drive assembly for the packaging station of FIG. 5A.

Referring to FIG. 5B, a vertical threaded rod 90 connected to a stepper motor 91 provides the vertical movement of the packaging station 36 in the direction of the double arrow D—D.

Referring again to FIG. 3B, there is shown a pair of UV lightguides 92 mounted to the outer casing of the fusion system 10 with a respective swivel fixture 94. The UV lightguides 92 are light pipes, for example, liquid filled conduits, which pass through a grommet 96 in the front panel of the station 10 and are connected to a UV light source positioned beside the fusion station 10.

During the packaging of the coupler, UV light passes through respective ends 98 of the light pipes 92 and radiates towards the epoxy 45 (FIG. 5B) previously placed in the substrate 43 in which the fibers sit, thereby causing the epoxy to cure. Typically, the light emitted from the pipes 92 is turned on and off automatically for a duration of about 15 to 30 seconds to cure the epoxy.

Referring now to FIGS. 6 through 15, there are shown various features of the removal station 34 which is used to bathe the fibers in hot sulfuric acid to remove the elastomeric buffer from the optical fibers. In addition, the removal station 34 provides a de-ionized water bath for rinsing and cleaning the fibers and for removing waste by-products.

Figure 6:
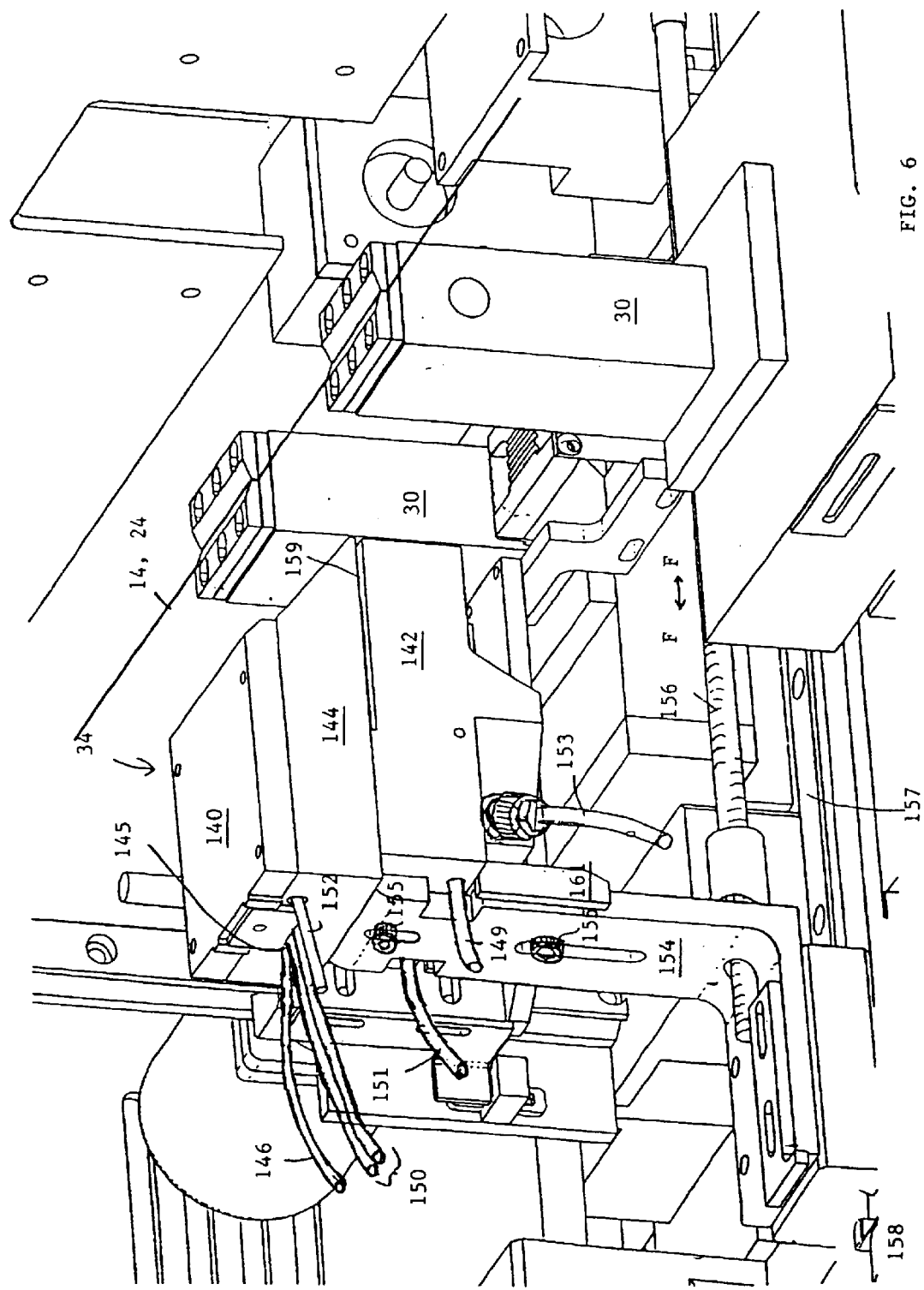
FIG. 6 is a perspective view of the removal station of FIGS. 3A and 3B.
Figure 7:
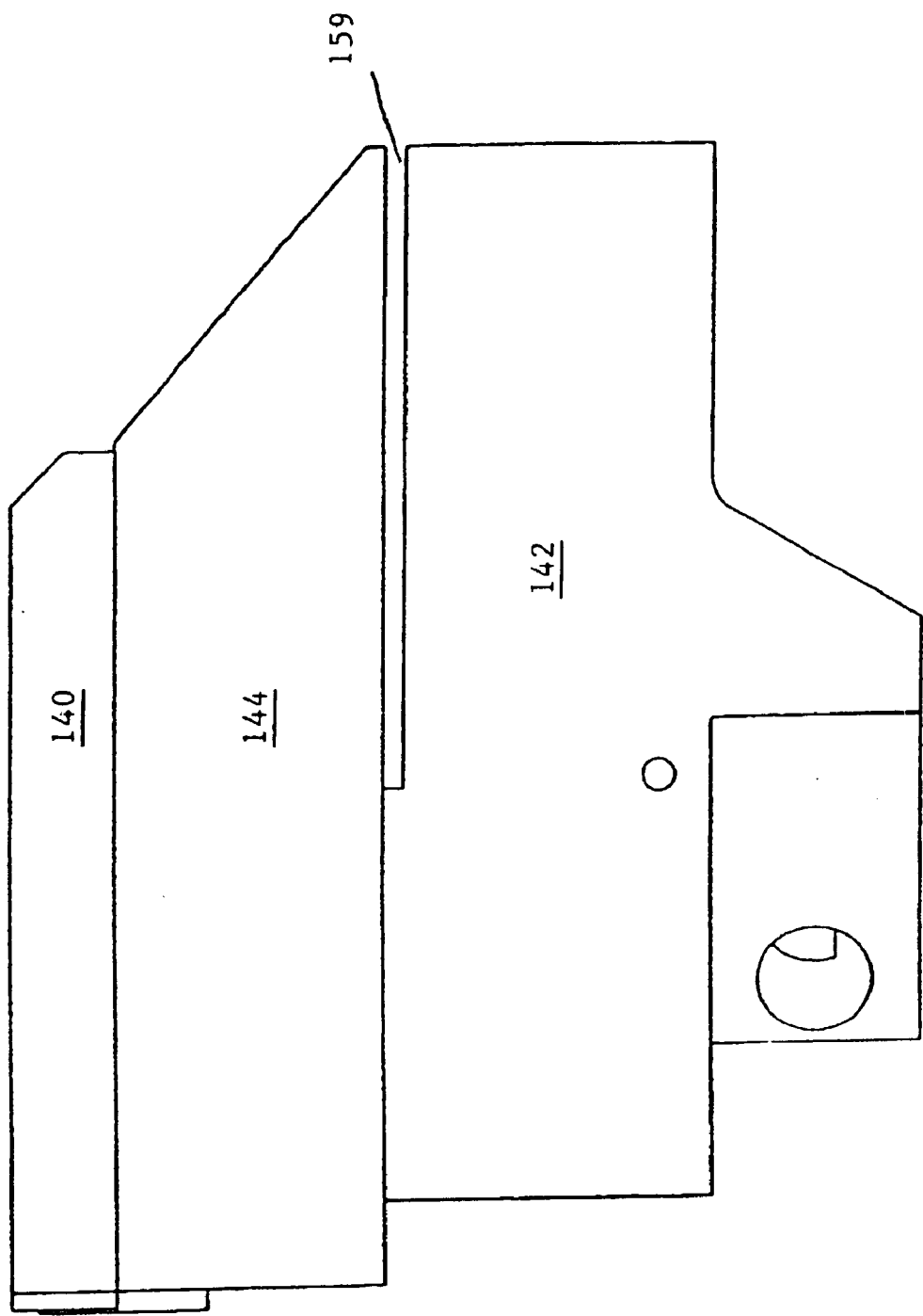
FIG. 7 is a side view of the removal station of FIGS. 3A and 3B.

Referring in particular to FIGS. 6 and 7, the removal station 34 includes a lid 140, a bottom basin 142, and a mid-portion 144. Each portion 140, 142, 144 is made from Teflon, though other materials can be used. A thermocouple 145 having a lead 146 is connected to the back of the removal station 34. The thermocouple 145 measures the temperature of a removal heater assembly 147 (FIG. 10) which heats the sulfuric acid to a nominal temperature between 160–200° C. which is then introduced into the removal station 34 for stripping the optical fibers. The removal heater assembly 147 (FIG. 10) positioned within the removal station 34 is electrically connected to a pair of power cords 150 that supply the energy from a power source. The sulfuric acid enters at room temperature through a Teflon tubing 152 into the mid-portion 144 of the removal station 34. There are also drain/fill tubes 149, 151 which provide and drain de-ionized water to the removal station 34. An additional tube 153 provides an additional path for waste products from the removal station 34. Not shown in FIG. 6 is a tube 499 (FIG. 20) which transmits waste acid away from the removal station 34. An acid temperature controller and a water temperature controller serve to control the temperature of the acid and the water, respectively.

The removal station 34 is mounted onto a vertical plate 154 with screws 155. An adjustable slide 161 allows for manual adjustment of the height of the removal station 34 by loosening and tightening the screws 155. The removal station 34 is also provided with a lead screw 156 connected to a DC motor to move the removal station back and forth along a rail 157 in the direction of the double arrow F—F. A set of limit switches 158 (only one of which is shown in FIG. 6) are positioned to control the range of motion of the removal station 34 in the direction of the double arrow F—F. The removal station 34 is also provided with a slot 159 in which the fibers reside when they are being bathed in acid and subsequently in rinse water. The slot 159 is about 2 mm thick, which is large enough for the fibers to pass through, but thin enough to prevent an operator from placing a finger in the slot which could cause physical injury if physical contact is made with the acid.

Figure 8:
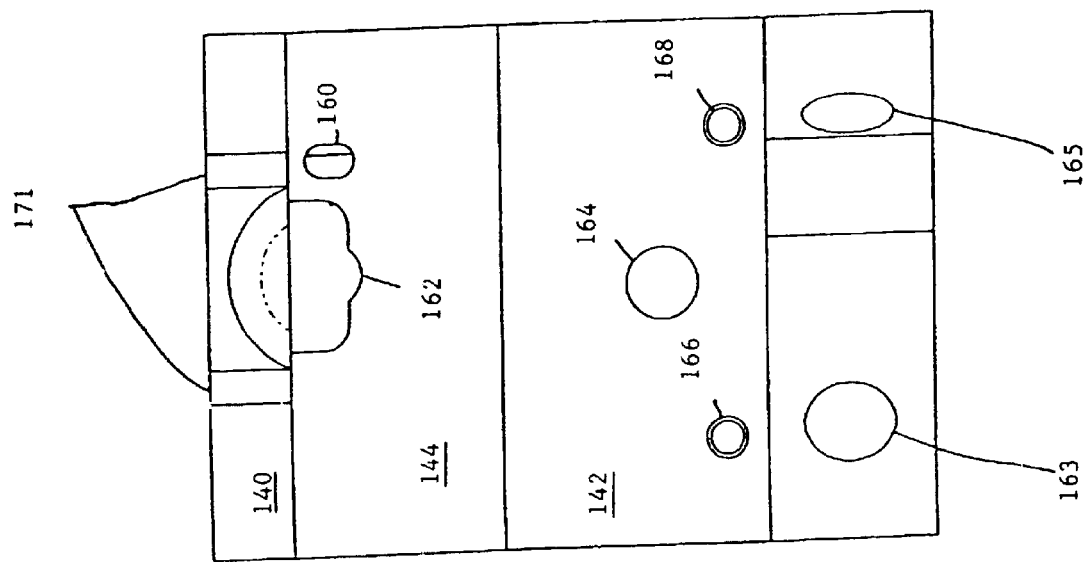
FIG. 8 is a back view of the removal station of FIGS. 3A and 3B.

Referring also to FIG. 8, when the removal station 34 is assembled, the lid 140 covers the removal heater assembly 147 held in the mid-portion 144 which also includes an acid feed outlet to the bottom basin 142. The bottom basin 142 contains the drain and rinse components of the removal station 34. The mid-portion 144 is provided with a hole 160 into which the Teflon tube 152 is fitted. A hole 162 provides access to the thermocouple 146 for measuring the temperature of the removal heater assembly 147, and access for the power cords 150 to the removal heater assembly 147.

The bottom basin 142 is provided with a mounting hole 164 into which a stainless steel insert is positioned to enable the removal station 34 to be mounted to the vertical plate 154. The additional holes 166 and 168 are used to feed the de-ionized water to the removal station 34 and to draw the water from the removal station after the rinsing process is completed. Further, a acid drain hole 163 is connected to the tube 499 (FIG. 20), and an overflow drain hole 165 is connected to the tube 153.

Figure 9:
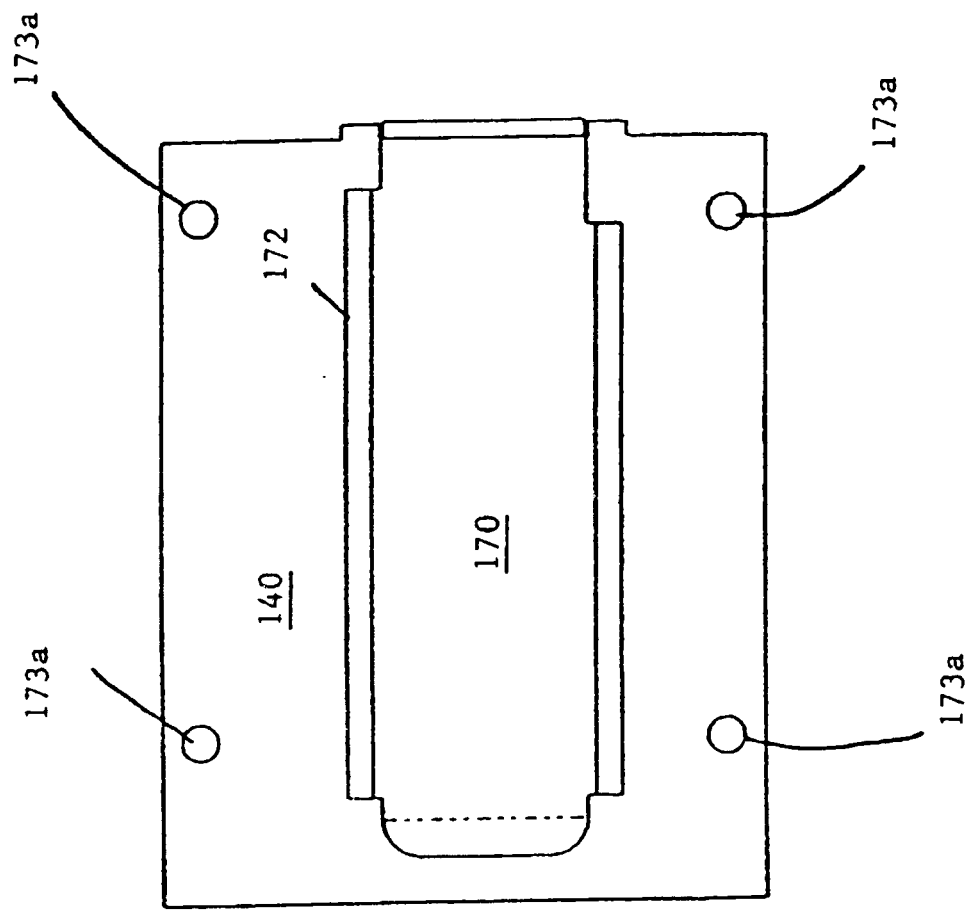
FIG. 9 is an interior view of a lid of the removal station shown in FIG. 6.

Referring now to FIG. 9, the lid 140 is provided with a depression 170 into which the top of the removal heater assembly 147 fits. The lid 140 is also provided with a pair of ridges 172 and 174 which fit into a cavity 176 (FIG. 11) of the mid-portion 144. A set of holes 173a facilitates connecting the lid 140 to a set of holes 173b of the mid-portion 144.

Figure 10:
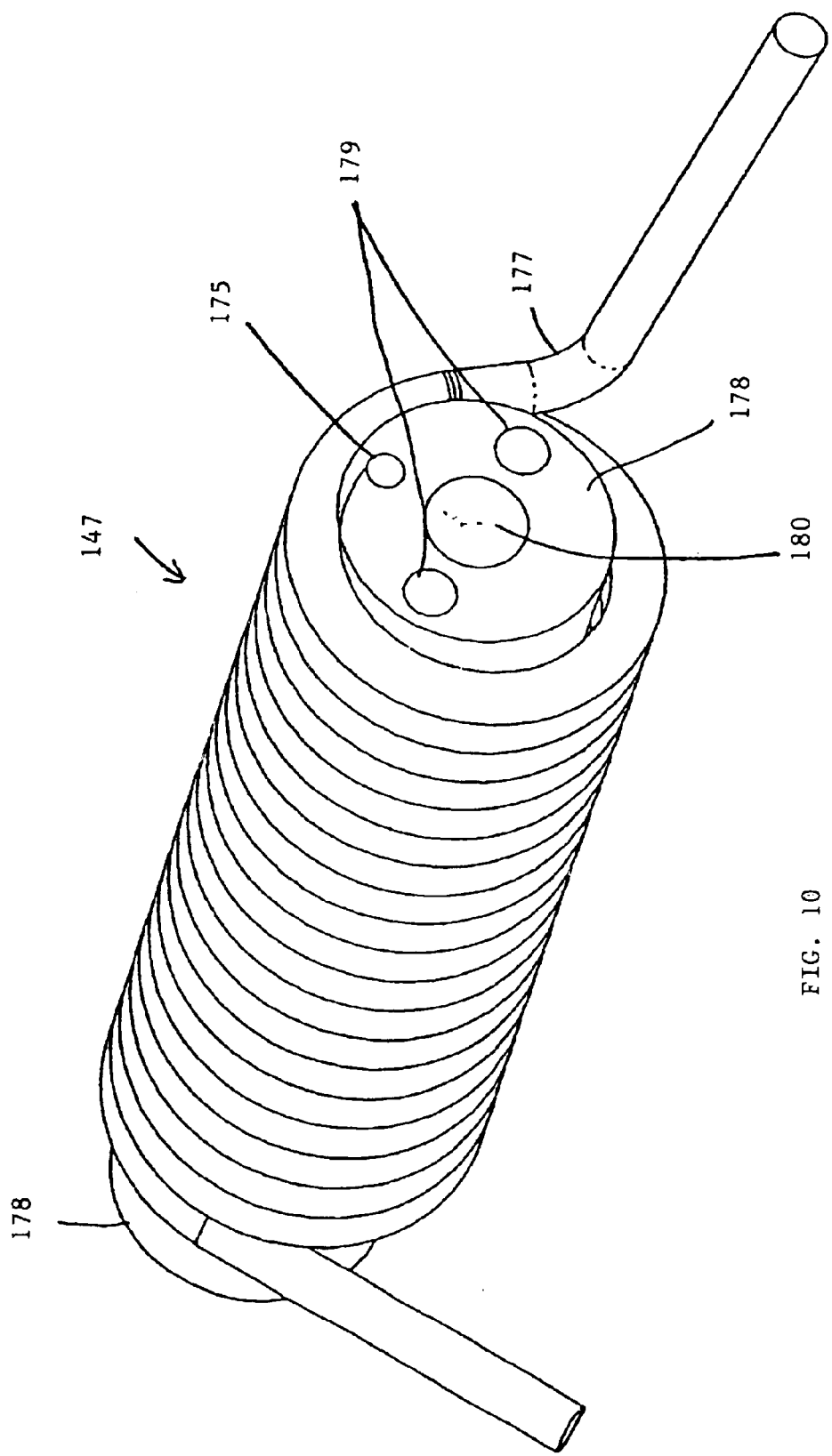
FIG. 10 is a close-up view of a removal heater assembly of the removal station shown in FIG. 6.
Figure 11:
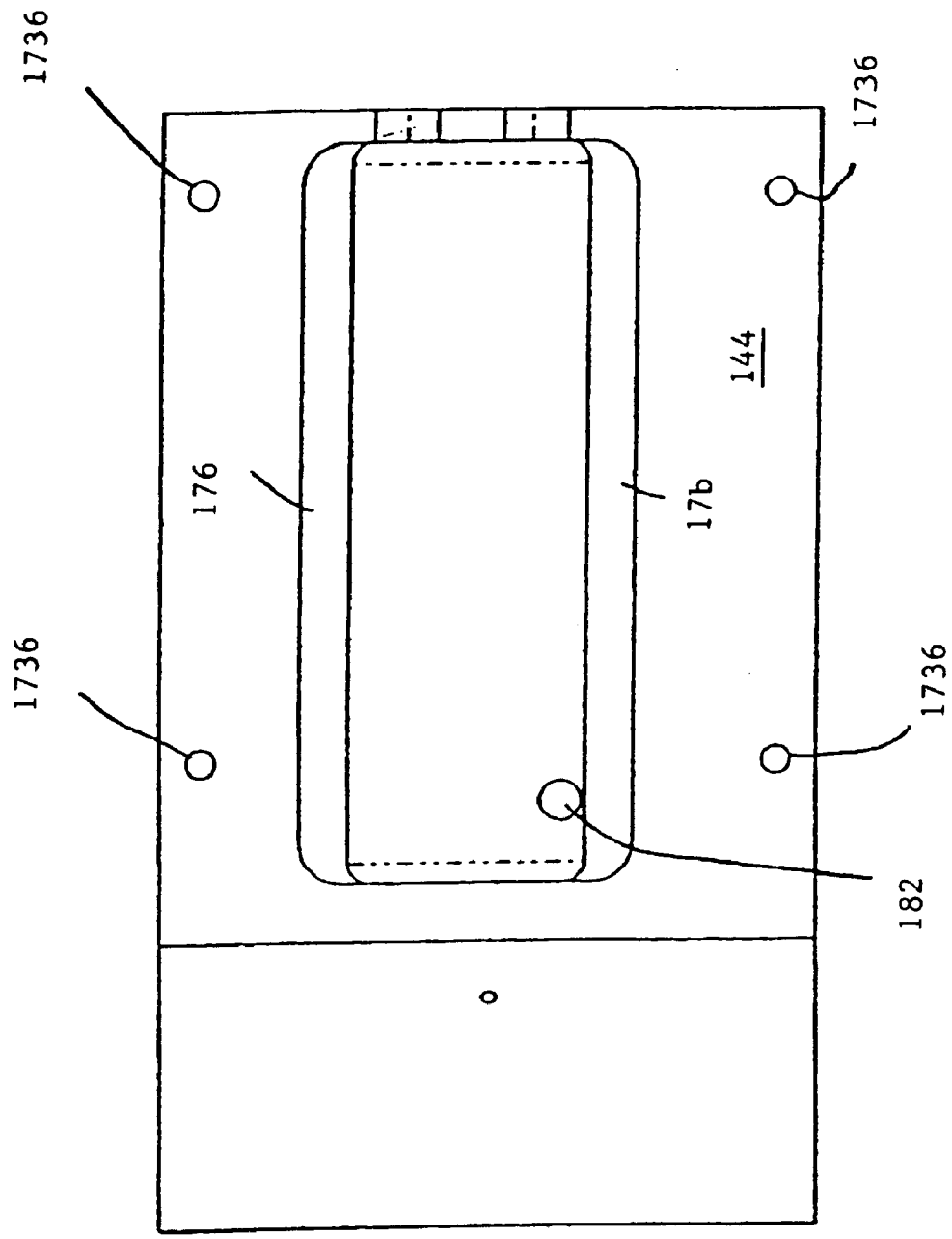
FIG. 11 is a top-side view of a mid-portion of the removal station of FIG. 6.
Figure 12:
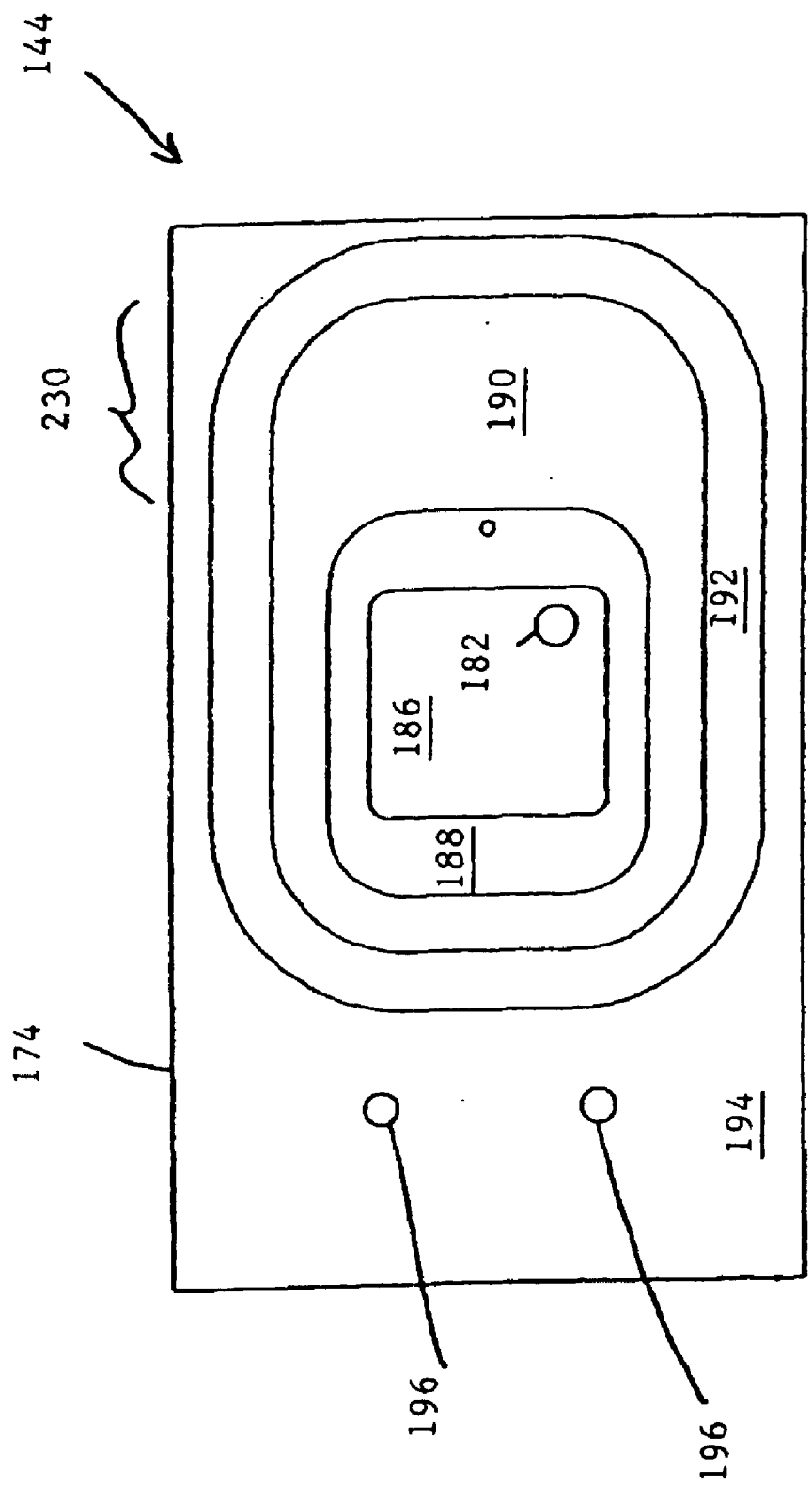
FIG. 12 is a bottom-side view of the mid-portion shown in FIG. 11.

The components of the removal heater assembly 147 are illustrated in greater detail in FIG. 10. The removal heater assembly 147 includes a heater coil 177 (an extension of tubing 152) which is spirally wound around an aluminum mandril 178. The mandril 178 is provided with a hole 180 into which an electrical heating cartridge is positioned. The electrical heating cartridge is connected directly to the power cords 150 which supplies the energy to heat the heating cartridge. An end of the heater coil 177 is fitted through a feed port 182 (FIG. 11) of the mid-portion 144 for delivering the acid to the underside 174 of the mid-portion 144, as illustrated in FIG. 12. That is, the feed port 182 extends from one side of the mid-portion 144 to the other side of the mid-portion 144. Thus the acid enters the removal station 34 via the tube 152 and then flows through the heater coil 177. As the acid circulates through the heater coil 177 the heat from the mandril 178 is transferred to the acid such that by the time the acid is delivered to the underside 184 of the mid-portion 144, its temperature has been raised from room temperature to about 160°–200° C. The removal heater assembly 147 also includes a screw hole 175 into which a strain relief screw sits. The strain relief screw engages with ribs 171 (FIG. 8) of the lid 140 to prevent the removal heater assembly from rotating. The thermocouple 145 (FIG. 6) is mounted in a pair of holes 179 of the mandril 178.

The underside 174 of the mid-portion 144 is shown in particular detail in FIG. 12. The heater coil 177 extends through the feed port 182 and is cut flush with the surface of an elevated region 186 of the underside 174. A depressed region 188 surrounds the elevated region 186, and a second elevated region 190 surrounds the depressed region 188. A second depressed region 192 separates the second elevated region 190 from a remainder 194 of the underside 174. A pair of mounting holes 196 facilitate securing the mid-portion 144 to a set of mounting holes 197 (FIG. 14) of the bottom basin 142.

Figure 13:
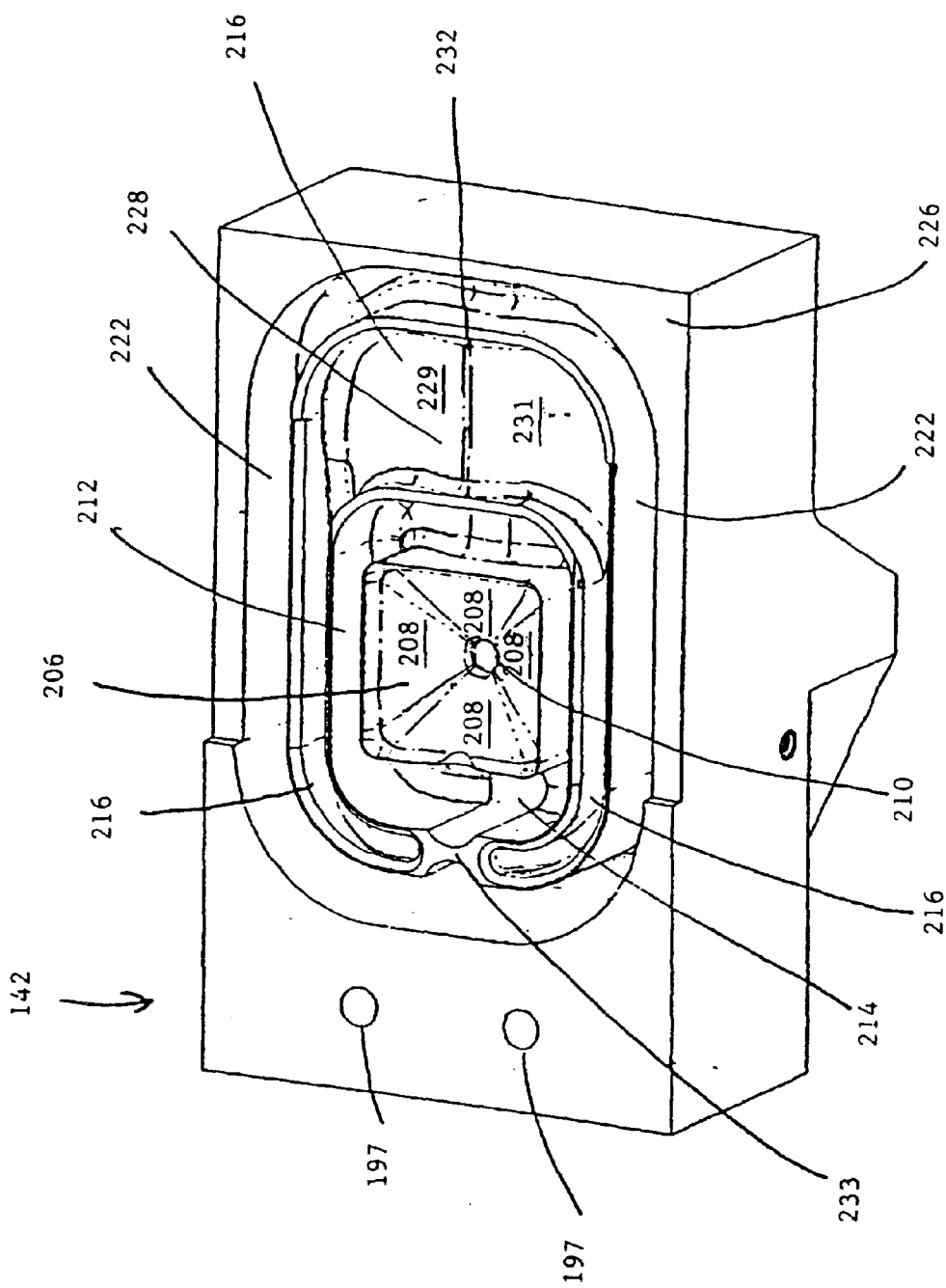
FIG. 13 is a perspective view of the topside of a basin portion of the removal station shown in FIG. 6.
Figure 14:
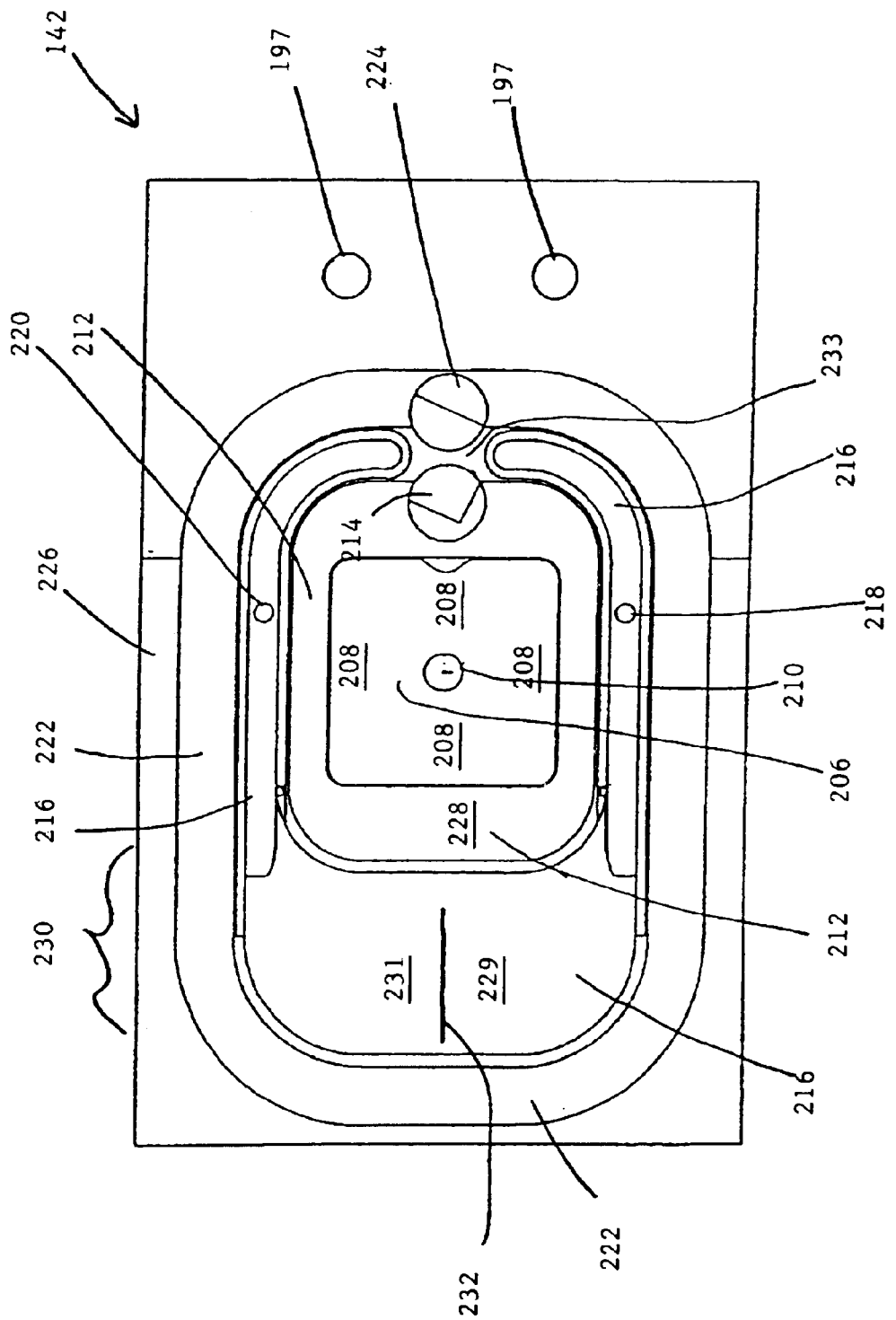
FIG. 14 is a top view of the basin portion shown in FIG. 13.
Figure 15:
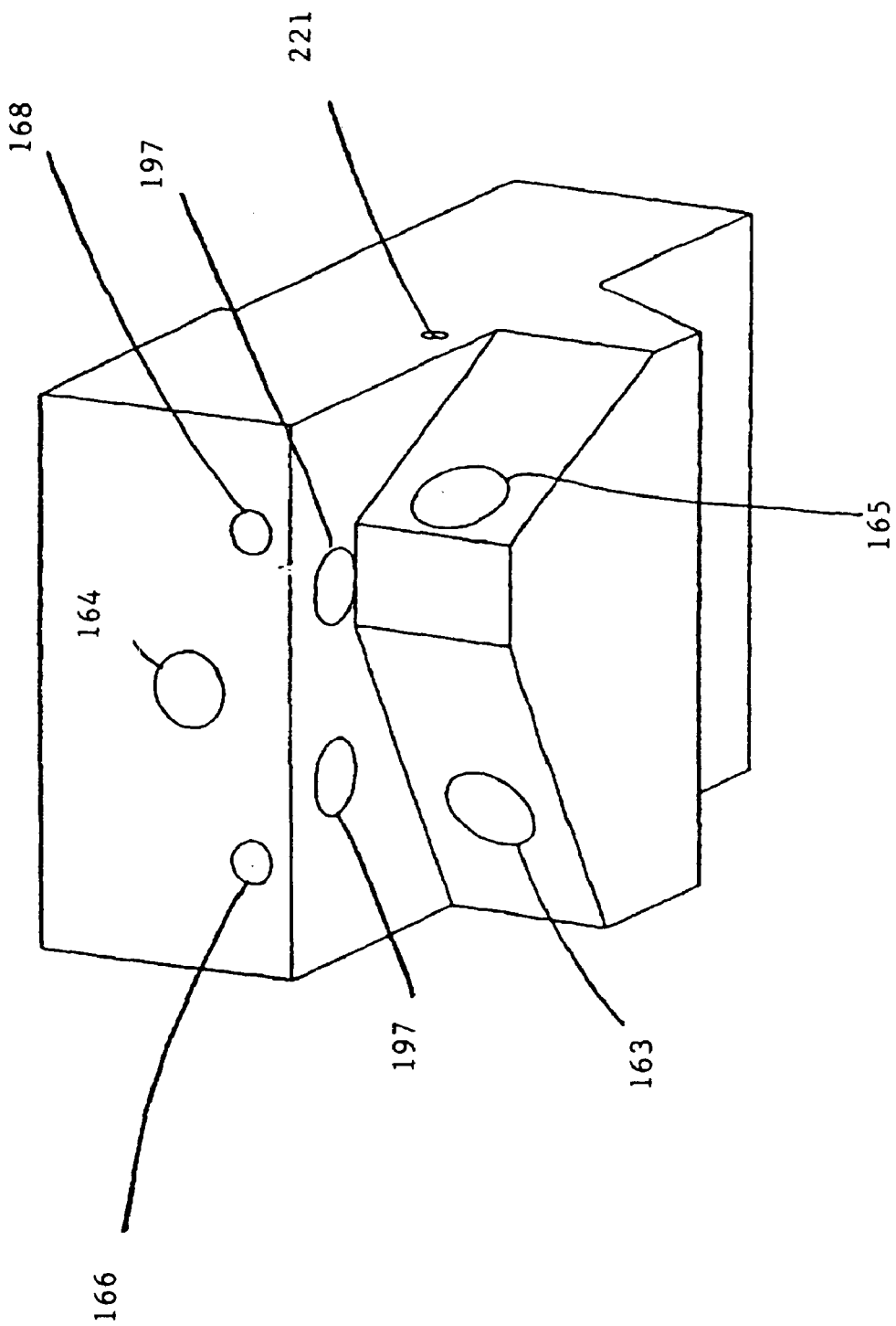
FIG. 15 is a perspective back view of the basin portion.

Referring now to FIGS. 13–15, the bottom basin 142 includes a central basin 206 having slanted walls 208 to facilitate drainage of the acid through an acid drain hole 210. A moat 212 surrounds the central basin 206 and is also provided with a drain hole 214. A de-ionized rinse water basin 216 is positioned about the moat 212. The water basin 216 includes fill and drain holes 218, 220. A cross hole 221 connects the fill and drain holes 218, 220. The cross hole is typically plugged with a stainless steel set screw wrapped in Teflon. An additional outer moat 222 separates the water basin 216 from the remainder of the bottom basin 142 and is provided with a drain hole 224. A L-shaped portion 226 of the bottom basin 142 defines the lower region of the slot 159 discussed previously.

Note that during the rinse cycle, the fibers reside in a wide region 230 (FIGS. 12 and 14) defined by the second elevated region 190 of the underside 174 of the mid-portion 144 and the water basin 216 of the bottom basin 142.

When in use, the acid is delivered through the feed port 182 of the mid-portion 144 to the central basin 206 of the bottom basin 142. The acid fills the central basin 206 until it reaches the elevated region 186 of the mid-portion 144 so that a meniscus forms across the entire surface of the elevated region 186. The depressed region 188 prevents the meniscus from bridging over to the second elevated region 190. De-ionized water enters through fill holes 218, 220 to fill the water basin 216. The water level reaches the second elevated region 190 of the mid-portion 144. Another meniscus forms across the second elevated region 190 but is prevented from extending over to the remainder 194 of the underside 174 by the second depressed region 192. Thus the underside 174 of the mid-portion 144 acts as a lid to contain the meniscus of the sulfuric acid and the meniscus of the de-ionized water. The fibers are placed in the meniscus of the sulfuric acid to etch them and subsequently in the meniscus of the water to cleanse them after they have been stripped of the buffer surrounding the fibers.

As the central basin 206 is filled with sulfuric acid, any spillage falls into the moat 212 and then drains out through the drain hole 214 through which a continuous vacuum is drawn. Note that the moat 212 is inclined downward from an upper region 228 to the drain hole 214 so that gravity helps draw the liquid to the drain hole 214. Similarly, any inward spillage of the de-ionized water falls into the moat 212 to be drained through the hole 214, and any outward spillage flows into the outer moat 222 drains through the drain hole 224. As with the drain hole 214, a continuous vacuum is drawn through the drain hole 224. Spillage though drain holes 214, 224 flows out of the overflow drain hole 165 connected to the tube 153 (FIG. 6). There is a small region 233 of the water basin 196 that does not fill with water. This region 233 acts as a vacuum break to prevent breaking the rinse water meniscus barrier with the vacuum drawn through the drain holes 214 or 224.

At the end of an etch/rinse cycle, the acid drains through the acid drain hole 210 and out of the hole 163 connected to the tube 499 (FIG. 20), and the rinse water drains out the drain holes 218, 220, and out of the holes 166, 168 respectively. Unlike the drain holes 214 and 224, the drain holes 210 and 218, 220 are not connected to a continuous vacuum. Instead the drain holes 210 and 218, 220 are connected to respective solenoid valves which are normally turned off. Only at the completion of the etch/rinse cycle, do the solenoid valves open to allow a vacuum to be drawn through the drain holes 210, 218, and 220. The water basin 216 is provided with two inclined regions 229 and 231 which define a ridge line 232 between them to facilitate drainage to the drain holes 218, 220.

Figure 16:
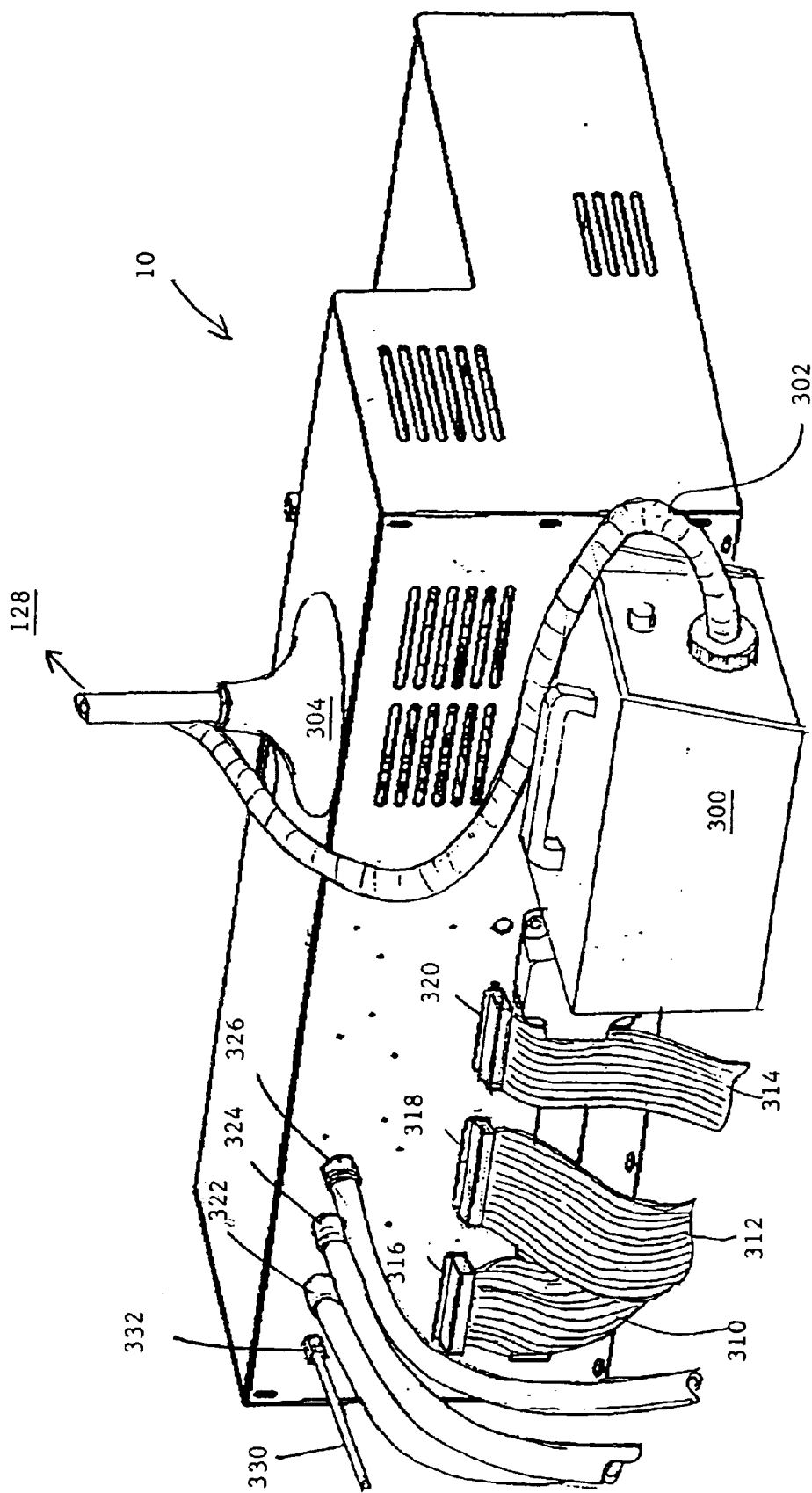
FIG. 16 is a view of the back of the fusion system of FIG. 1.

Additional features of the fusion system 10 are shown in FIG. 16, in particular, the electrical and fluid connections to the system located on the backside of the station. Light used for illumination for the microscope 28 is provided by a light source 300 connected to a hose 302 which in turn is attached to a base 304 of the microscope 28. Also shown in FIG. 16 are control ribbon cables 310, 312, 314 connected with respective connectors 316, 318, 320. These cables 310, 312, 314 carry control signals between the computer and the various components of the fusion system 10. Further, there are inlet vacuum tubes 322, 324, 326 which provide vacuum to the draw chucks 42, 44 and the base 78 of the packaging station 36.

Further, hydrogen is transmitted to the ceramic torch 46 through a hydrogen line 330 connected to a port 332 at one end and to a hydrogen bottle at the other end. The line 330 is not made from flexible tubing, but rather from rigid stainless steel to provide protection against leakage and to protect against breakage for safety purposes.

Figure 17:
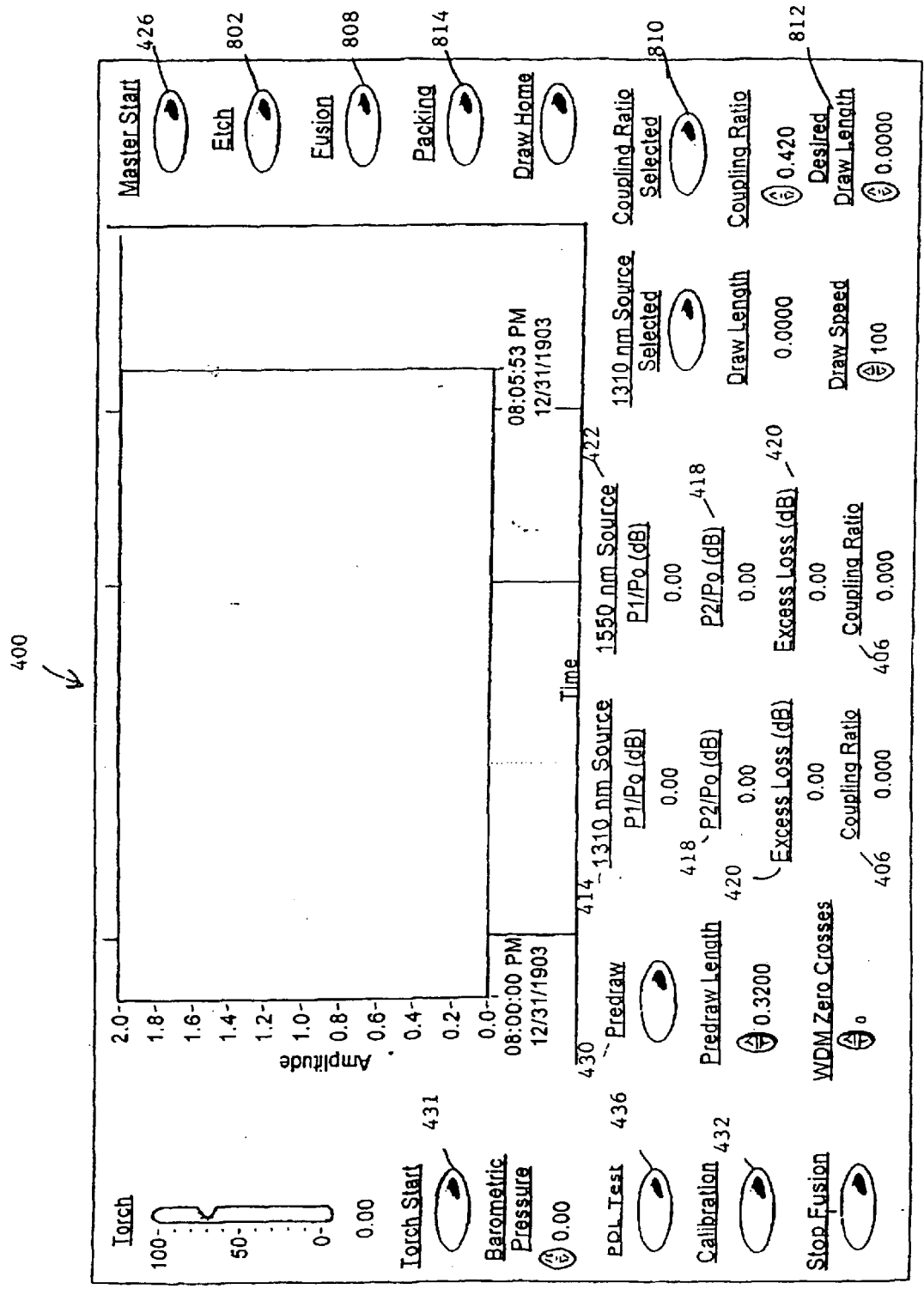
FIG. 17 is a view of a monitor screen of the fusion system of FIG. 1.

A typical computer screen 400, such as a graphical user interface (GUI), of the video monitor 27 seen by the operator during the fabrication process is shown in FIG. 17. Typical output and input parameters shown on the screen 400 include the coupling ratio of the coupler expressed as a percentage 406 for an optical source 1 (1310 nm) 414 and a ratio of the output power to the input power 418, which is basically an insertion loss measurement. Similarly, the excess loss (EL) 420 may be displayed. Details of an optical source 2 operating at 1550 nm 422 are also illustrated in FIG. 17. Further, there are shown various control keys for, such as, the start of the operation 426 and a pre-pull feature 430 which is required for certain wideband couplers. The hydrogen flow rate is controlled by a start/stop button 431. There are also a calibration button 432 and a polarization-dependent loss (pdl) button 436.

Figure 18:
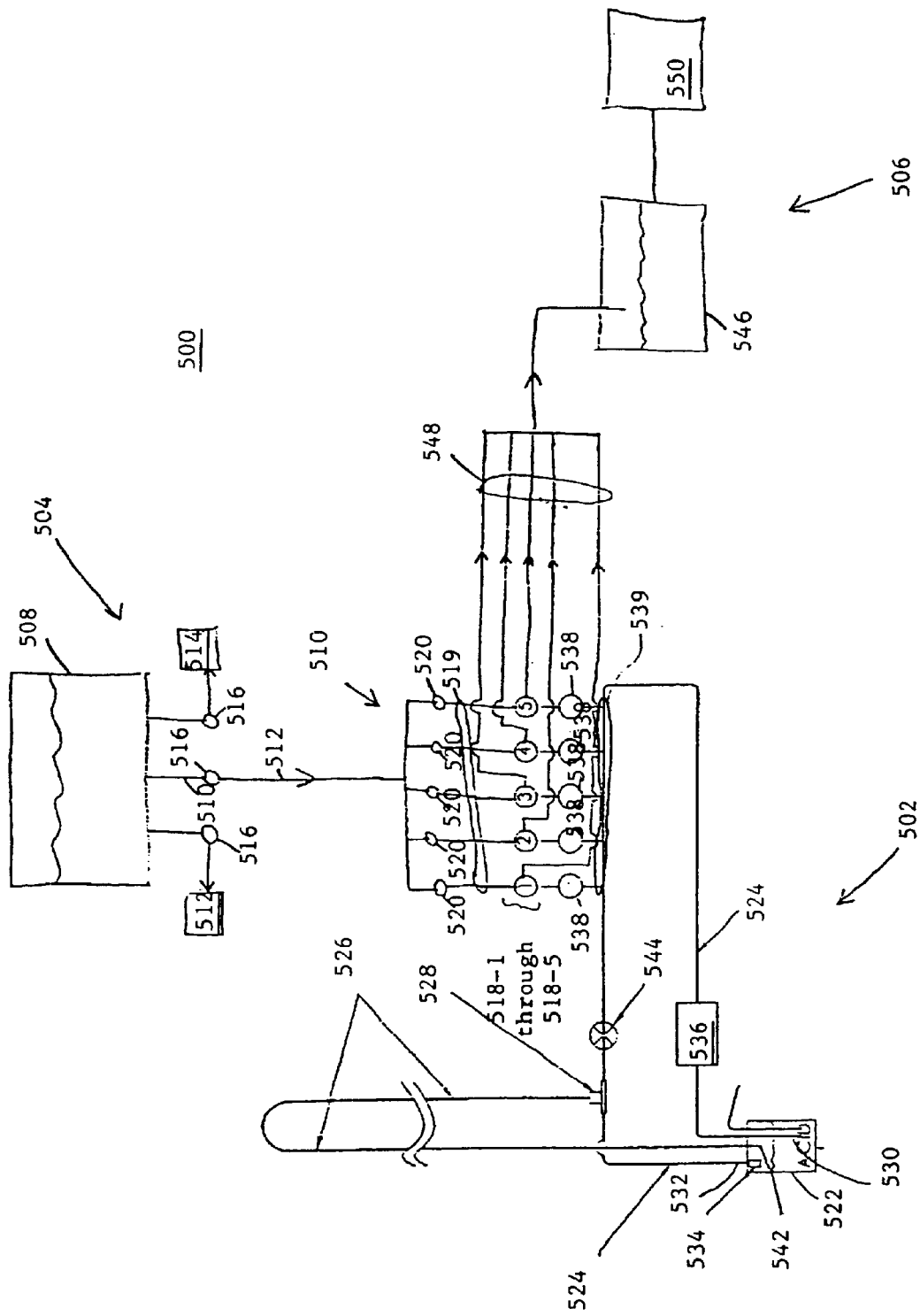
FIG. 18 is a schematic diagram illustrating the acid/fluid delivery system of the fusion system of FIG. 1.
Figure 19:
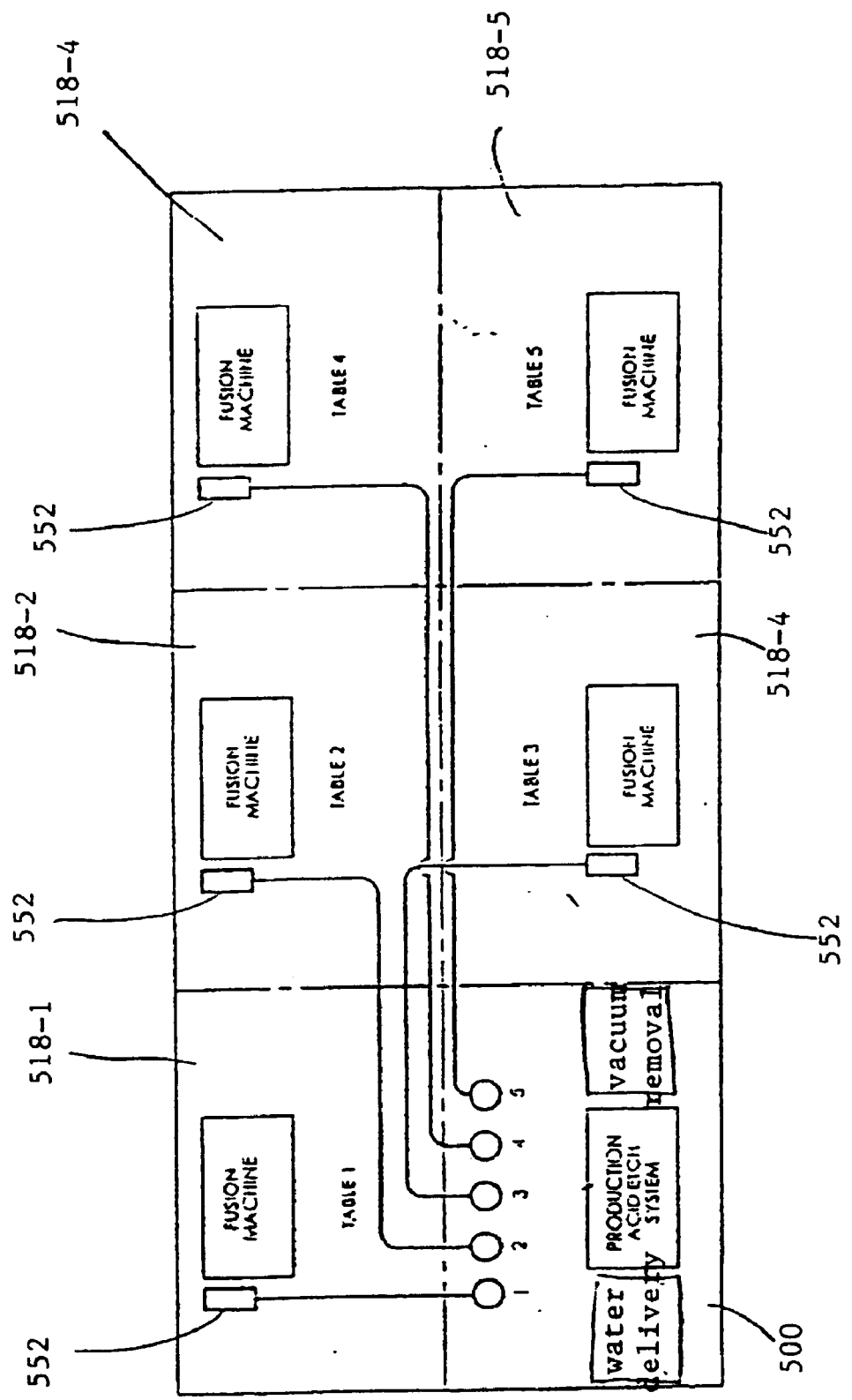
FIG. 19 is a layout of the acid/fluid delivery system of FIG. 18 supplying acid and fluid for multiple fusion systems.
Figure 20:
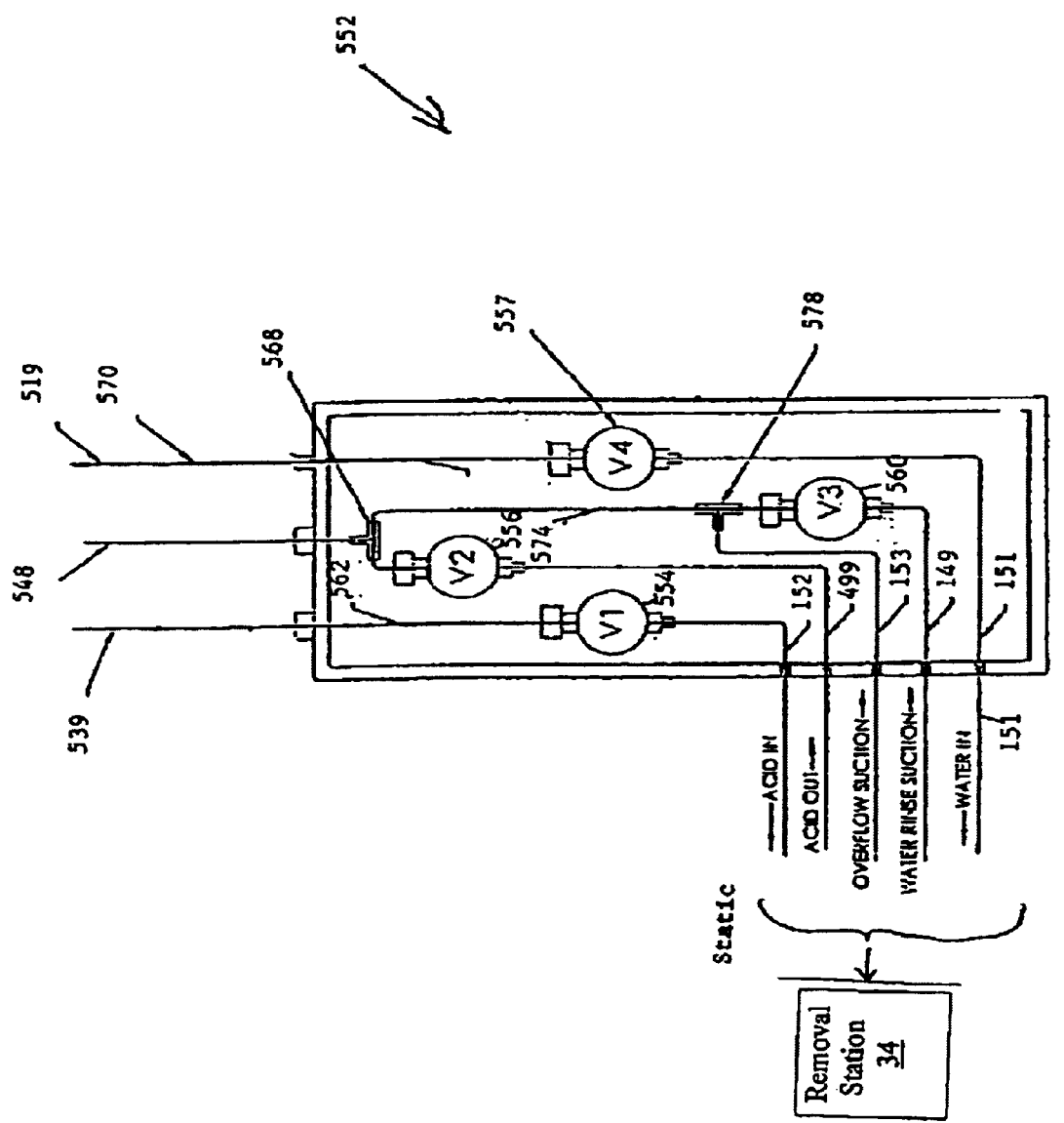
FIG. 20 is a close-up view of a valve controller associated with each fusion system of FIG. 19.

Referring now to FIGS. 18 through 20, there is shown the layout of the fluid delivery system 500. The fluid delivery system includes an acid delivery system 502, a water delivery system 504, and a vacuum fluid removal system 506.

The water delivery system 504 includes a reservoir 508 and lines 510 and 512, made from, for example, polyethylene, which transmit the water held in the reservoir 508 to a production pod 510. In a typical arrangement, the reservoir 508 also supplies water to two additional pods 512 and 514. The water supplied to the production pods 510, 512, and 514 is gravity fed such that the water has a pressure head of about seven feet. A set of valves 516 are manually operated to direct the water to any or all of the pods 510, 512, and 514.

The pod 510 (as well as each of the pods 512, and 514) includes five fusion stations 518-1 through 518-5. An additional set of valves 520 are also under manual operation to provide further control of the flow of water to the fusion stations 518-1 through 518-5 through a set of water lines 519 so that none, any or all of the fusion stations are supplied with water.

Turning attention to the acid delivery system 502, the system 502 includes an acid supply container 522 which holds sulfuric acid, a line 524 which transmits the acid to the fusion stations 518-1 through 518-5, and a manometer 526 connected to the line 524 with a T-connector 528.

The line 524 and the manometer 526 are typically made from 0.25 inch and 0.5 inch tubing, respectively. One end 530 of the line 524 is positioned within the liquid acid and the other end 532 is provided with a 0.125 inch fixed constrictor 534. A pump 536 transmits the acid from the acid container 522 to the fusion stations 518-1 through 518-5. A set of manually operated flow valves 538 controls the flow of acid to the fusion stations from the line 524 through a set of acid in-lines 539. The rate of the pump 536 in combination with the constrictor 534 maintains the supply of acid to the fusion stations under pressure. The manometer 526 provides a visual indication of the supply pressure of the acid to the fusion stations. Typically, the acid has a pressure head of about four feet. The manometer 526 also serves as a relief path for the acid in the event that the constrictor 534 clogs up with debris. In such a situation, the acid flows over the u-shaped region 540 of the manometer 526 and out the end 542 of the manometer. In some implementations, the region of the line 524 between the manometer 526 and the fusion stations 518-1 through 518-5 is provided with a regulator 544 which prevents the backflow of acid from the manometer to the fusion stations when the pump 536 is unable to maintain a sufficient supply pressure to the fusion stations.

The fluid removal system 506 includes a sealed container 546, a set of lines 548 which direct waste water and acid from each of the fusion stations 518 to the container 546, and a pump 550 which creates a vacuum in the container 546. Thus, after an etch sequence or a bath sequence, the waste fluid is directed through a respective line 548 to the container 546.

Referring to FIG. 20, each fusion station 518 includes a valve box 552 provided with four solenoid valves 554, 556, 558, and 560 that are under computer control to control the flow of acid and water to and from the fusion station 518, in particular, to and from the removal station 34. The acid in line 539 includes a 0.75 inch tube 562 that is connected to the solenoid valve 554 which in turn is connected to the 0.125 inch 152 tube that directly leads to the removal station 34. The waste acid from the removal station 34 is directed through an acid out line 499 to the solenoid valve 556 which in turn is connected to the waste line 548 through a T-connector 568. The water in line 519 is provided with a 0.25 inch tube 570 connected to the solenoid valve 557 which is connected to a 0.125 inch tube 151 that leads to the removal station 34. The waste water is transmitted through the water out line 149 made of 0.125 inch tubing to the solenoid valve 560 which is connected to a 0.125 inch tube 574 which in turn is connected to the waste line 548 through the T-connector 568. The backup waste line 153 is used to direct overflow water and acid away from the removal station 34. The back up waste line 153 is connected to the tube 574 through a T-connector 578. The solenoid valves 556 and 560 are under computer control to direct waste acid and water away from the removal station. The backup waste line 153 on the other hand is under constant vacuum since it is directly connected to the sealed container 546 via the lines 574 and 548.

Figure 21A:
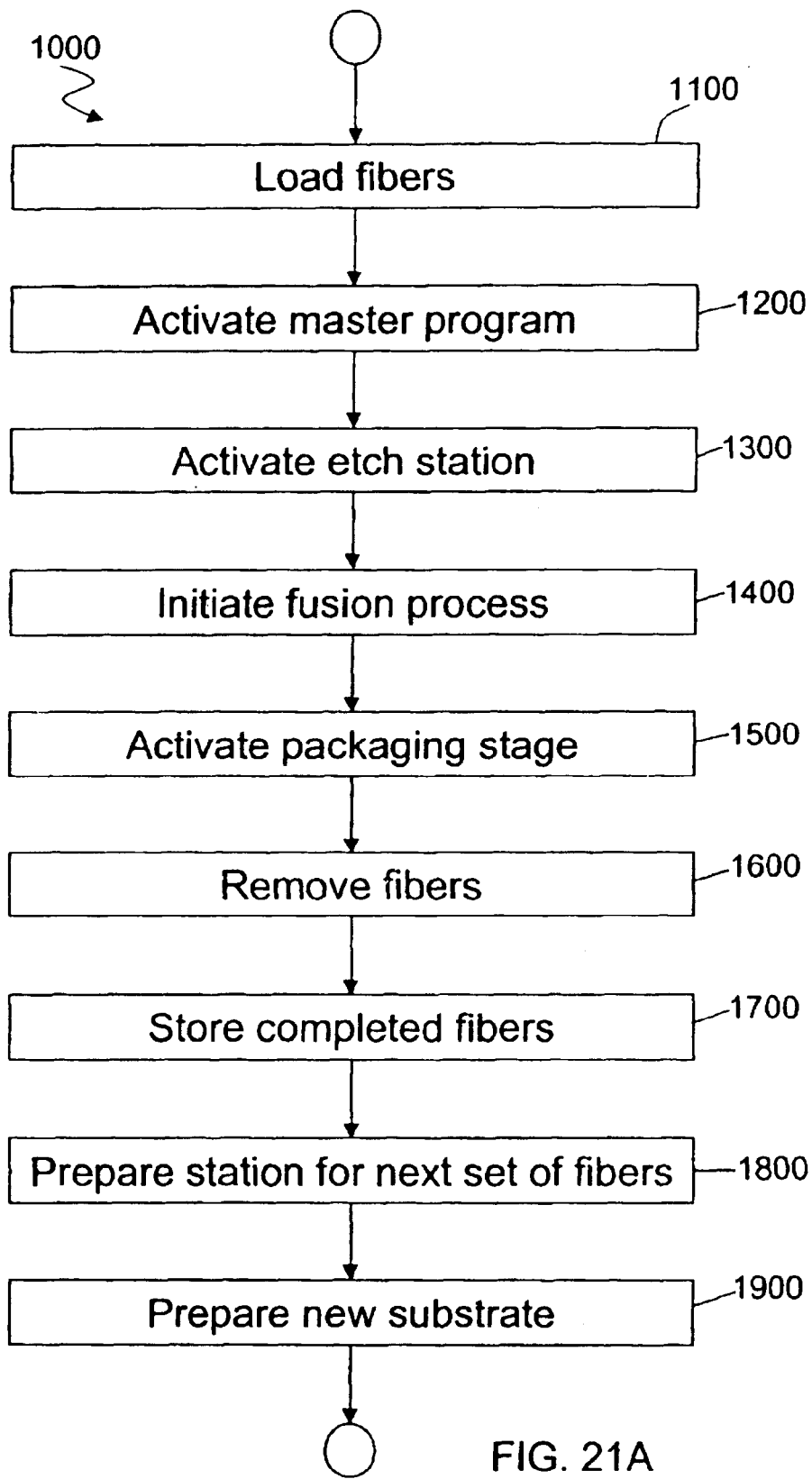
FIGS. 21A through 21D are flow diagrams of a sequence of automated steps performed to optically couple a pair of optical fibers.
Figure 21B:
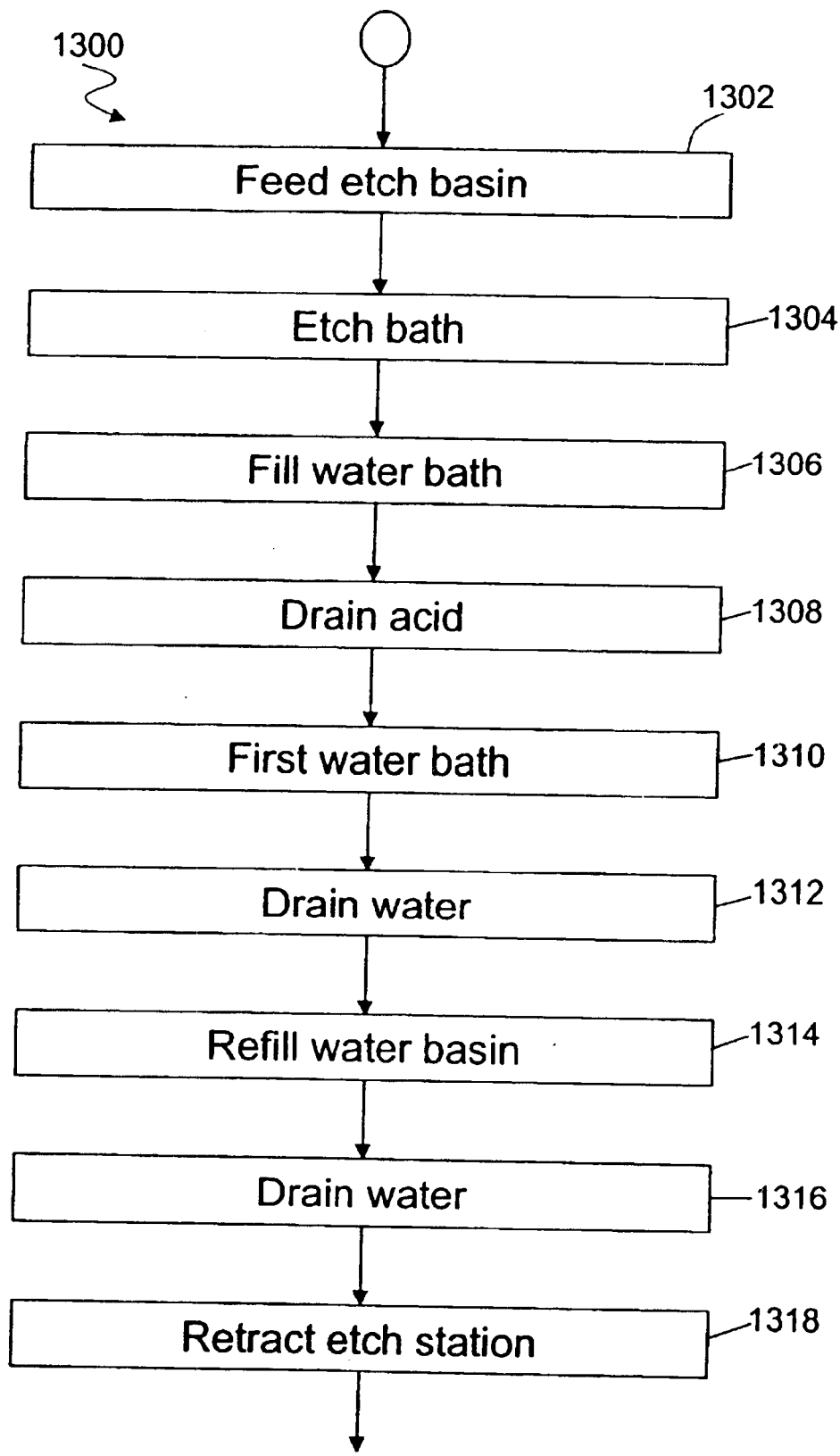
Figure 21C:
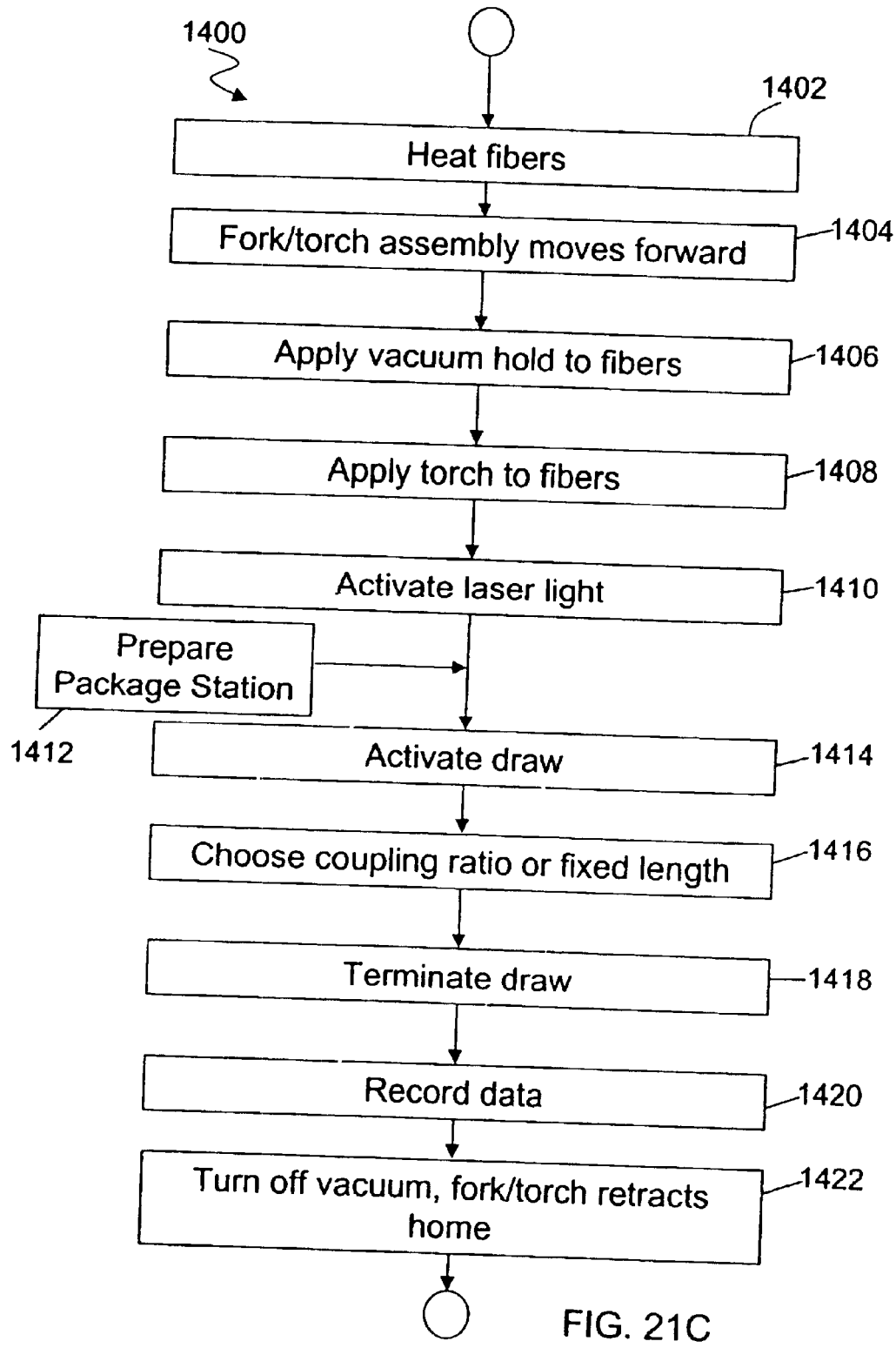
Figure 21D:
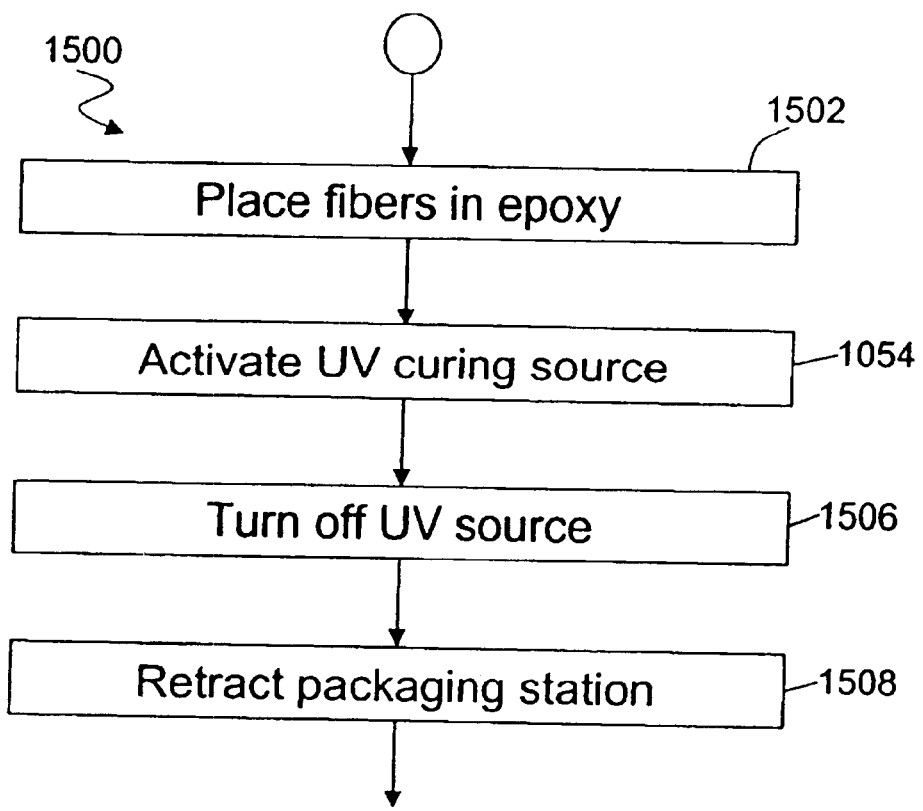

A sequence of steps 1000 performed with the automated fusion system 10 to fuse fibers is depicted in FIGS. 21A–21D. Further, FIG. 19 illustrates the video screen the operator interacts with during the fabrication process. In the present invention, certain steps of the process 1000 shown in FIG. 21A are automated and under software control. An embodiment of the invention use the software LABVIEW, produced by National Instruments Corporation, Austin, Texas, to operate the fusion system 10.

First, in a step 1100, an operator loads the fibers 14, 24 onto the vacuum chucks 42 and 44 of the draw assembly 30, and stretches the fibers 14, 24 by hand until they are taut. Next, in a step 1200, the operator activates the master program (button 426, FIG. 17), which ensures that all the components of the fusion system are in their proper positions.

Then, in a step 1300, the operator activates the removal station 34 (button 802, FIG. 17). At that time, the temperature of the sulfuric acid has been raised between 160° and 200° C. as it flows through the heater 177 coil wound around the aluminum mandril 178. In a step 1302 (FIG. 21B), the computer instructs the solenoid 554 to open to allows acid to feed into the central etch basin 206 for a period of about 5 seconds, which is enough time to fill the etch basin 206 with approximately 1 cm of acid. Then, in a step 1304, the removal station 34 immediately moves forward, engulfing the optical fibers 14, 24. The optical fibers 14, 24 pass through the slot 159 of the removal station 34 such that the fibers are positioned within the acid meniscus formed over the central etch basin 206. The fibers 14, 24 sit in the hot sulfuric acid for approximately fifteen seconds, which is a sufficient amount of time to completely remove the elastomeric buffer from the optical fibers.

As the removal station 34 moves into position over the optical fibers 14, 24 or with the optical fibers 14, 24 already positioned in the slot 159, in a step 1306, the solenoid 557 opens so that the water basin 216 surrounding the etch basin 206 in the removal station 34 is filled with de-ionized water. As this occurs, the water meniscus forms. Any hot sulfuric acid that spills or splashes falls into the moat 212 that surrounds the etch basin 206.

Next, in a step 1308, after the acid etching is complete, the controller instructs the solenoid valve 556 to open which allows the acid to drain from the etch basin 206. The drainage of the acid typically takes about nine seconds.

Then, in a step 1310, the removal station 34 automatically retracts approximately one-half inch so that the fibers 14, 24 that were previously positioned in the acid meniscus are now directly positioned over the wide region 230 of the de-ionized rinse water basin 216, where the fibers sit for about 10 seconds as they are rinsed with the de-ionized water rinse. Subsequently, in a step 1312, the solenoid valve 560 opens to drain the rinse water from the de-ionized water basin 216. Next, in a step 1314, the solenoid 557 again opens to refill the de-ionized rinse basin 216. The refill process takes about ten seconds. The fibers 14, 24 remain in rinse region 230 for about 10 to 30 seconds in during the second water rinse. At the completion of the second rinse, in a step 1316, the solenoid 560 again opens to drain the water from the water basin 216 for the second time. And, in a step 1318, the removal station 34 retracts to its home position.

Next, in a step 1400 (FIG. 21A), the operator initiates the fusion process (button 808, FIG. 17). Initially, the torch assembly 32 "homes" to ensure that it knows physically where it is located. Then the torch assembly 32 moves forward towards the optical fibers 14, 24. As the torch assembly moves forward, the torch 46 is in elevated position so that the fibers 14, 24 are not subjected to the heat from the flame of the torch 46, even when the torch 46 is positioned directly over the fibers 14, 24.

In a step 1402 (FIG. 21C), the torch assembly 34 moves forward and then stops when the fibers are laying over the thermal strip heater 62 on the fork plate 55. The thermal strip heater 62 heats the fibers 14, 24 for a period of about 20 seconds to a temperature of about 100° C. During this time, any residual rinse water, which was on the fibers, is evaporated and any residual sulfuric acid contaminants, which might have been present, are reacted with the buffer of the fiber. Thus, after this heating process concludes, there is no water or unreacted sulfuric acid left on the fibers 14, 24.

Then, in a step 1404, the torch assembly 32 again moves forward so that the holes 60 of the ferrules 58 are directly located beneath and between the two fibers 14, 24. At that moment, in a step 1406, the inward motion of the torch assembly 32 stops, and a solenoid is activated so that a vacuum is drawn through the holes 60 in the ferrules 58. The vacuum applies a force on the optical fibers such that the fibers 14, 24 are brought together.

After approximately one-half to one second, in a step 1408, the torch 46 descends directly over the optical fibers 14, 24, with the ferrules 58 located on either side of the torch 46. The torch 46 descends to a predetermined position where the heat of the flame of the torch is sufficient to fuse the optical fibers and to enable them to be drawn into a fused coupler.

The height of the torch 46 above the fibers 14, 24 is an operator-selectable value determined empirically. Input parameters used to select the optimum torch height include, for example, the required temperature to fuse the fibers and the width of the fused region. A typical torch height above the optical fibers is about 3 mm. The torch is fueled by a hydrogen gas introduced through a flow controller into the ceramic portion of the torch. Combustion occurs when the hydrogen reacts with the oxygen in the air.

Note, prior to activating the draw stage, in a step 1410, the operator uses the laser source 16 to inject laser light, typically with a wavelength of about 1310 nm or about 1550 nm, into the end 12 of one of the fiber 14 and connects the other end 18 to the optical detector 20. One end 22 of the second fiber 24 is connected to the other optical detector 26. Thus, the laser light only enters through the end 12 of the fiber 14, and initially, before the draw, exits entirely through the end 18 of the fiber 14.

After a delay of about one half second with the fibers 14, 24 positioned under the heat of the hydrogen torch, in a step 1414, the draw assembly plates 54 which support the vacuum chucks 42, 44 move outward at a predetermined speed of about 100 and 200 microns per second. Therefore, because the fibers 14, 24 are secured to the vacuum chucks 42, 44, the fibers elongate as they are being subjected to the intense heat of the hydrogen flame (a flame temperature of about 1,700° C.), adhere to each other, and flow together. As the draw continues, the laser light entering through the end 12 of the fiber 14 couples across to the other fiber 24. As such, the operator will observe on the video monitor 27 that the optical power in the fiber 14 decreases while the optical power in the coupled fiber 24 increases.

In a step 1416, the station then allows the operator to choose whether to draw to a predetermined coupling ratio (button 810, FIG. 17) or whether to draw to a fixed length (button 812, FIG. 17). In either case, in a step 1418, the draw plates 54 stop when the draw condition is met and the torch 46 immediately elevates to remove the fibers 14, 24 from the heated zone of the torch 46.

In a step 1420, upon completion of the draw, the computer automatically records the data associated with the draw, such as the draw length, draw speed, coupling ratio, desired coupling ratio, the insertion loss on each fiber, the wavelength at which the ratio was measured, the wavelength light source (1310 nm or 1550 nm) and the insertion losses at those wavelengths and other such parameters that might be useful in subsequent diagnostics.

After approximately one second, in a step 1422, during which time the fibers cool, the vacuum to the ferrules 58 of the fork plate 55 is turned off and the torch assembly 32 retracts back into its home position. (The vacuum is turned off to prevent dragging the fabricated coupler out the vacuum chucks 42, 44.)

After the torch assembly 32 fully retracts to its home position, then, in a step 1500 (FIG. 21A), the operator activates the packaging station 36 (button 814, FIG. 17). The packing station 36 moves forward until the substrate 43 held within the slot 76 by a vacuum is beneath the optical fibers 14, 24. (Note that prior to the start of the draw, in a step 1412, the operator loads the packaging station 36 with the substrate 43, which has the epoxy 45 applied to each end of the substrate's channel.) The packaging station 36 elevates with the substrate 43 until the fused fibers 14, 24 sink into the epoxy 45 so that the thinned coupling region is suspended freely between the two epoxy bonds.

After the fibers are placed in the epoxy, in a step 1502 (FIG. 21D), the fibers 14, 24 sit in the epoxy for about five to ten seconds to enable the epoxy to flow around and engulf the optical fibers. Next, in a step 1504, the computer activates the UV light source so that ultraviolet light of the desired intensity propagates through the liquid filled light pipes 92. The light pipes 92 are positioned at an angle above the vacuum chucks 42, 44, and are directed towards the substrate 43.

After about 10 to 30 seconds, in a step 1506, the UV exposure sufficiently cures the epoxy 45, and the computer turns off the UV light source. Then, in a step 1508, the packaging station 36 moves downward leaving the fibers 14, 24 suspended between the vacuum chucks 42, 44 with the substrate 43 attached to the fibers 14, 24.

At this point, in a step 1600 (FIG. 21A), the computer prompts the operator to remove the completed coupler assembly. The operator, in a step 1700, removes the coupler and possibly coils the leads and places the coupler in a storage bin or some other protective carrier.

Next in a step 1800, after the operator has removed the substrate and the coupler from the assembly, the operator prepares the fusion system 10 to make the next coupler. The operator, in a step 1900, loads a new substrate 43, along with the fresh uncured epoxy 45 applied at each end of the substrate, into the packaging 36. As the station 10 is initialized, the draw plates 54 return to their normal start positions, which usually takes about ten seconds. After the two stages have retracted to their start position, the operator begins to prepare the next cycle, that is, the operator mounts new optical fibers in the left and right vacuum chucks 42, 44 for the next draw.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for forming an optical coupler, comprising:
   a draw assembly for holding optical fibers and for applying a tension to the fibers, the fibers being held substantially parallel to each other in the draw assembly;
   a removal station for stripping buffer material from the fibers after the fibers have been placed in the draw assembly, the removal station having a removal heater assembly for heating acid used to strip the buffer material;
   a torch assembly for heating the fibers as the draw assembly applies a tension to the fibers in a manner that causes the fibers to fuse together to form a coupler region; and
   a packaging station for securing a substrate to the coupler region of the fibers to form the optical coupler.

2. The apparatus of claim 1, further comprising an optical detector for monitoring the extent of the coupling while the optical coupler is being formed.

3. The apparatus of claim 1, wherein the removal station is provided with a thermocouple to measure the temperature of the acid.

4. The apparatus of claim 1, wherein the removal heater assembly includes a heater coil spirally wound around a mandril which contains an electrical heating cartridge.

5. The apparatus of claim 1, wherein the removal station is provided with an acid inlet and an acid drain hole.

6. The apparatus of claim 1, wherein the removal station is provided with a rinse water inlet hole and a water drainage hole.

7. The apparatus of claim 1, wherein the removal station includes an acid etching section which facilitates formation of a meniscus of acid in which the fibers reside while being stripped of buffer material.

8. The apparatus of claim 1, wherein the removal station includes a rinse section which facilitates formation of a meniscus of rinse material in which the fibers reside while being rinsed of acid.

9. The apparatus of claim 1, wherein the removal station uses sulfuric acid to strip the buffer material.

10. The apparatus of claim 9, wherein the sulfuric acid is heated to a temperature of about between 160° C. to 200° C.

11. The apparatus of claim 1, wherein the removal station uses de-ionized water to rinse acid from the fibers.

12. The apparatus of claim 1, wherein the draw assembly includes a pair of vacuum chucks.

13. The apparatus of claim 12, wherein each of the vacuum chucks is provided with a V-groove in which the fibers are positioned.

14. The apparatus of claim 13, wherein the vacuum chucks are coupled to a vacuum source which creates a suction along the V-grooves.

15. The apparatus of claim 12, wherein the vacuum chucks are drawn apart at a rate of about between 50 microns/sec to 500 microns/sec.

16. The apparatus of claim 1, wherein the torch assembly includes a ceramic torch.

17. The apparatus of claim 16, wherein the ceramic torch uses hydrogen fuel to produce a flame at the bottom of the ceramic torch.

18. The apparatus of claim 1, wherein the torch assembly includes a fork plate having connector ferrules through with a vacuum is drawn which causes the fibers to be in contact.

19. The apparatus of claim 18, wherein the torch assembly includes a ceramic torch that is independently movable relative to the fork plate.

20. The apparatus of claim 18, wherein the fork plate includes a strip heater for evaporating residual water and acid from the fibers.

21. The apparatus of claim 1, wherein the packaging station includes a base provided with at least one slot into which the substrate is placed.

22. The apparatus of claim 21, wherein the base is connected to a vacuum source which draws a vacuum through a hole in the at least one slot to create a suction to hold the substrate in place.

23. The apparatus of claim 1, wherein epoxy is placed at opposite ends of the substrate.

24. The apparatus of claim 1, further comprising a UV curing light source which emits radiation to cure epoxy placed at opposite ends of the substrate after the fibers have been placed in the substrate.

25. The apparatus of claim 1, further comprising a fluid delivery system for delivery of acid and water to and from the removal station.

26. The apparatus of claim 25, wherein the delivery system includes a valve control box.

27. The apparatus of claim 26, wherein the valve control box includes a first solenoid valve for controlling the flow of acid to the removal station and a second solenoid valve for controlling the flow of acid from the removal station.

28. The apparatus of claim 26, wherein the valve control box includes a first solenoid valve for controlling the flow of water to the removal station and a second solenoid valve for controlling the flow of water for the removal station.

29. The apparatus of claim 25, wherein the fluid delivery system includes an acid delivery system, a water delivery system, and a vacuum fluid removal system.

30. The apparatus of claim 29, wherein the water delivery system includes a reservoir arranged such that the water is fed to the removal station by gravity.

31. The apparatus of claim 29, wherein the acid delivery system includes a supply line for transmitting acid to the removal station, the supply line having one end placed in an acid supply container, and an opposite end provided with a constrictor to maintain the supply rate of acid to the removal station.

32. The apparatus of claim 31, wherein the acid delivery system includes a pump which in combination with the constrictor maintains the supply rate of acid to the removal station.

33. The apparatus of claim 31, wherein the acid delivery system includes a manometer to visually monitor the supply pressure of the acid to the removal station, and to provide a relief path in the event that the constrictor clogs up with debris.

34. The apparatus of claim 33, wherein the acid delivery system includes a regulator which prevents backflow of acid from the manometer to the removal station in the event that the supply pressure is inadequate.

35. The apparatus of claim 1, further comprising a controller to control the functions of the draw assembly, removal station, torch assembly, and packaging station.

36. The apparatus of claim 35, wherein the controller facilitates monitoring the functions of the draw assembly, removal station, torch assembly, and packaging station.

* * * * *